US010979255B2

(12) United States Patent
Lopez et al.

(10) Patent No.: US 10,979,255 B2
(45) Date of Patent: Apr. 13, 2021

(54) SYSTEMS AND METHODS OF PERFORMING DATA TRANSMISSION AND RECEPTION IN A COMMUNICATION SYSTEM

(71) Applicants: Miguel Lopez, Solna (SE); Bo Hagerman, Morristown, NJ (US)

(72) Inventors: Miguel Lopez, Solna (SE); Bo Hagerman, Morristown, NJ (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 338 days.

(21) Appl. No.: 15/774,397

(22) PCT Filed: Nov. 1, 2016

(86) PCT No.: PCT/SE2016/051072
§ 371 (c)(1),
(2) Date: May 8, 2018

(87) PCT Pub. No.: WO2017/082797
PCT Pub. Date: May 18, 2017

(65) Prior Publication Data
US 2020/0252245 A1 Aug. 6, 2020

Related U.S. Application Data

(60) Provisional application No. 62/255,280, filed on Nov. 13, 2015.

(51) Int. Cl.
*H04L 25/03* (2006.01)
*H04W 4/70* (2018.01)
*H04L 27/26* (2006.01)

(52) U.S. Cl.
CPC .... *H04L 25/03834* (2013.01); *H04L 27/2607* (2013.01); *H04L 27/2636* (2013.01); *H04L 27/2649* (2013.01); *H04W 4/70* (2018.02)

(58) Field of Classification Search
None
See application file for complete search history.

(56) References Cited

U.S. PATENT DOCUMENTS

| 2003/0058950 A1* | 3/2003 | McCoy | H04L 27/2631 |
|---|---|---|---|
| | | | 375/260 |
| 2010/0104042 A1* | 4/2010 | Benjebbour | H04L 5/0005 |
| | | | 375/285 |
| 2015/0180622 A1* | 6/2015 | Yoo | H04L 1/1854 |
| | | | 370/330 |

FOREIGN PATENT DOCUMENTS

EP  2 252 026 A2  11/2010

OTHER PUBLICATIONS

Supplementary European Search Report issued in EP Application No. 16864665.1 dated Oct. 2, 2018, 3 pages.

(Continued)

*Primary Examiner* — Jason E Mattis
*Assistant Examiner* — Hong Shao
(74) *Attorney, Agent, or Firm* — Patent Portfolio Builders, PLLC

(57) ABSTRACT

Systems and methods of performing data transmission and reception in a communication system are presented. In one exemplary embodiment, a method performed by a wireless device for transmitting a signal in a first communication system that is frequency-domain multiplexed with a second communication system may include generating (201), by a modulator (401), a modulated signal that represents one or more information symbols. The modulated signal may include one or more modulation symbols of the first communication system. The method may also include filtering (203), by a pulse shaping filter (403), the modulated signal to obtain the filtered modulated signal. The pulse shaping filter (403) may be configured to operate with a period that corresponds to the symbol rate of the second communication (Continued)

system. In addition, the method may include transmitting (209), by a transmitter (409), the filtered modulated signal at a carrier or sub-carrier frequency of the first communication system.

10 Claims, 21 Drawing Sheets

(56) References Cited

OTHER PUBLICATIONS

Kashiwamura et al., "Investigation on Single-Carrier and Multi-Carrier Hybrid System for Uplink", IEEE 20th International Symposium on Personal, Indoor and Mobile Radio Communications, Sep. 13, 2009, pp. 3188-3192.
Huawei et al., "Analysis of In-Band Operation", 3GPP TSG RAN WG1, Meeting #82bis, R1-155971, Malmo, Sweden, Oct. 5-9, 2015, 5 pages.
International Search Report and Written Opinion issued in Application No. PCT/SE2016/051072 dated Feb. 7, 2017, 15 pages.
Nokia Networks: "Evaluation of SC-FDMA UL for NB-IoT", 3GPP TSG RAN4, Meeting #77, R4-157453, Anaheim, USA, Nov. 15-22, 2015, 10 pages.
Samsung: "Narrowband IOT—Uplink Design", 3GPP TSG RAN WG1, Meeting #82bis, R1-155514, Malmo, Sweden, Oct. 5-9, 2015, 5 pages.
Iith et al.: "SC-FDMA with frequency domain pulse-shaping for uplink", 3GPP TSG-RAN WG1, #83, R1-156545, Anaheim, USA, Nov. 15-22, 2015, 10 pages.
Neul et al.: "FDMA uplink with GMSK/PSK modulation", 3GPP TSG RAN WG1, Meeting #82bis, R1-155962, Malmo, Sweden, Oct. 5-9, 2015, 16 pages.
Samsung: "Narrowband IoT—Overview of Downlink Design", 3GPP TSG RAN WG1, Meeting #82bis, R1-155510, Malmo, Sweden, Oct. 5-9, 2015, 6 pages.
Ericsson et al.: "NB LTE—Concept Description L1", 3GPP TSG-RAN, Meeting#69, RP-151397, Phoenix, Arizona, USA, Sep. 14-16, 2015, 24 pages.
Ericsson et al.: "NB-LTE—General L1 Concept Description", 3GPP TSG-RAN WG1, Meeting#82bis, R1-156010, Malmo, Sweden, Oct. 5-9, 2015, 16 pages.
Qualcomm Inc.:"New Work Item: NarrowBand IOT (NB-IOT)", 3GPP TSG RAN, Meeting#69, RP-151621, Phoenix, USA, Sep. 14-16, 2015, 9 pages.
Shilo et al., "11ax Support for IoT—Requirements and Technological Implications", Huawei Technologies, IEEE, 802.11-15/1375-00-00ax, Nov. 11, 2015, 24 pages.
Shilo et al., "11ax Support for IoT", Huawei Technologies, IEEE, 802.11-15/1134r0, Sep. 9, 2015, 18 pages.
Shilo et al., "11ax Support for IoT", Huawei Technologies, IEEE, 802.11-15/1134r2, Sep. 9, 2015, 19 pages.
Shilo et al., "11ax Support for IoT", Huawei Technologies, IEEE, 802.11-15/1134r1, Sep. 9, 2015, 19 pages.
Shilo et al., "11ax Support for IoT—Requirements and Technological Implications", Huawei Technologies, IEEE, 802.11-15/1375-01-00ax, Nov. 11, 2015, 24 pages.
Office Action issued in corresponding EP Application No. 16864665.1 dated Oct. 15, 2018, 08 Pages. The references cited therein have previously been made of record.

\* cited by examiner

300

301

IN A FIRST COMMUNICATION SYSTEM THAT IS FREQUENCY-DOMAIN MULTIPLEXED WITH A SECOND COMMUNICATION SYSTEM, RECEIVE, BY A RECEIVER OF THE WIRELESS DEVICE, AT A CARRIER OR SUB-CARRIER FREQUENCY OF THE FIRST COMMUNICATION SYSTEM THAT IS DIFFERENT FROM A CARRIER OR SUB-CARRIER FREQUENCY OF THE SECOND COMMUNICATION SYSTEM, A MODULATED SIGNAL THAT REPRESENTS ONE OR MORE INFORMATION SYMBOLS, WHEREIN THE MODULATED SIGNAL INCLUDES ONE OR MORE MODULATION SYMBOLS OF THE FIRST COMMUNICATION SYSTEM WITH EACH MODULATION SYMBOL HAVING AT LEAST ONE OF: (1) A PERIOD THAT IS EQUIVALENT TO A SYMBOL RATE OF THE SECOND COMMUNICATION SYSTEM, (2) A DURATION THAT IS EQUAL TO OR LESS THAN ONE MODULATION SYMBOL OF THE SECOND COMMUNICATION SYSTEM, AND (3) A STARTING TIME SUCH THAT THE MODULATION SYMBOL AS RECEIVED STARTS IN A CYCLIC PREFIX INTERVAL OF MODULATION SYMBOLS OF THE SECOND COMMUNICATION SYSTEM

303

DEMODULATE, BY A DEMODULATOR OF THE WIRELESS DEVICE, THE MODULATED SIGNAL TO OBTAIN INFORMATION SYMBOLS

FIG. 3

SYSTEMS AND METHODS OF PERFORMING DATA TRANSMISSION AND RECEPTION IN A COMMUNICATION SYSTEM

CROSS REFERENCE TO RELATED APPLICATION

This application is a 35 U.S.C. § 371 National Stage of International Application No. PCT/SE2016/051072, filed Nov. 1, 2016, designating the United States and claiming priority to U.S. provisional application No. 62/255,280, filed on Nov. 13, 2015. The above identified applications are incorporated by this reference.

FIELD OF DISCLOSURE

The present disclosure relates generally to the field of communications, and in particular to performing data transmission and reception in a communication system.

BACKGROUND

Machine-type communications (MTC) or machine-to-machine (M2M) communications envisions that everything that benefits being connected will be connected, which is also referred to as the Internet of Things (IoT). MTC/M2M communications offer a growth opportunity for the $3^{rd}$ Generation Partnership Project (3GPP) ecosystem and also a new revenue generation for mobile operators. In order to support IoT, the 3GPP community/operators have to address usage scenarios with devices that may be connected in challenging coverage conditions, e.g., indoor and basements. Moreover, MTC devices are expected to be energy efficient (e.g., battery life of ten years), and have low cost such that they may be deployed in massive scale. An enhanced coverage improvement target of fifteen to twenty decibels (15-20 dB) is required to support MTC devices that are deployed in challenging locations, e.g. deep inside buildings, and to compensate for signal-to-noise ratio (SNR) loss due to complexity reduction techniques.

The Networked Society and Internet of Things (IoT) is associated with new requirements for cellular networks such as with respect to device cost, battery lifetime and coverage. To reduce device and module cost, a system-on-a-chip (SoC) solution with integrated power amplifier (PA) is desirable. However, the current state-of-the-art of PA technology only allows about twenty to twenty-three decibel-milliwatts (20-23 dBm) transmit power when the PA is integrated in the SoC. This constraint limits uplink coverage from a user terminal to a serving base station. To improve this uplink coverage using a PA integrated in an SoC, it is necessary to avoid PA backoff. PA backoff is needed when the communication signal has a non-unity peak-to-average power ratio (PAPR). The higher the PAPR, the higher the PA backoff. Higher PA backoff also reduces PA efficiency, resulting in increased power consumption by the PA. Thus, for wireless IoT technologies, designing an uplink communication signal that has a lower PAPR is important for achieving the performance objectives concerning device cost, battery lifetime and coverage.

Currently, $3^{rd}$ Generational Partnership Project (3GPP) is working on extending the Long Term Evolution (LTE) standard to better support IoT applications. 3GPP is standardizing Narrow-band IoT (NB IoT) technologies that may be deployed using one hundred and eighty kilohertz (180 kHz) system bandwidth, such as described by 3GPP RP-151621, *New Work Item: Narrowband IOT (NB-IOT)*, Qualcomm, September 2015, Phoenix, Ariz. NB IoT is required to support three different modes of operation: stand-alone operation, guard-band operation and in-band operation. The stand-alone operation utilized, for example, the spectrum currently being used by GSM/EDGE systems as a replacement for one or more GSM carriers. The guard-band operation utilizes the unused resource blocks within a guard band of an LTE carrier. The in-band operation utilizes resource blocks within a normal LTE carrier. A leading candidate solution for NB IoT is an LTE-based NB-LTE solution. For this solution, the LTE uplink is based on single-carrier frequency-division multiple-access (SC-FDMA) modulation for uplink data and control channels. SC-FDMA requires certain accuracy of timing advancement to preserve orthogonality between UEs.

In LTE, an uplink random access procedure is used by user equipment (UE) to access an LTE network. The random access signal also allows the base station to estimate the timing advance needed so that the subsequent signals transmitted by a UE, e.g. Physical Uplink Shared Channel (PUSCH) signals, may arrive at the base station within the cyclic prefix interval (CP). By doing so, orthogonality among uplink modulation signals is maintained, thanks to the Single-Carrier Frequency-Division Multiple-Access (SC-FDMA) scheme employed in LTE. However, a poor timing advance estimate may result in the loss of orthogonality among the uplink modulation signals and degraded PUSCH performance.

The performance objectives of NB IoT include ultra-low module cost, twenty decibels (20 dB) coverage extension, and ten-year battery lifetime. To achieve these objectives, it is desirable to make the PAPR as close to zero decibels (0 dB) as possible, especially for UEs that are in poor coverage areas. One solution to achieve close to zero decibels (0 dB) PAPR for the random access signal is to use a frequency-hopping, phase-continuous single subcarrier signal. However, such a random access signal may result in a poor timing advance estimate at the base station due to its narrow signal bandwidth characteristics. For example, the error in a timing advance estimate may be as large as thirty microseconds (30 μsec.), which exceeds the LTE normal CP of 4.7 μs. The sub-carrier spacing of NB-LTE may be scaled down from a fifteen kilohertz (15 kHz) subcarrier spacing for an uplink shared channel in LTE to 2.5 kHz subcarrier spacing, such as described by 3GPP R1-156010, *NB-LTE—General L1 concept description*, Ericsson. In this example, scaling down the subcarrier spacing by a factor of six compared to LTE provides a six times increase in CP, which helps cope with poor timing accuracy. However, using 2.5 kHz subcarrier spacing for NB IoT may introduce a coexistence problem with LTE for the aforementioned in-band and guard-band operations. Although, using 2.5 kHz subcarrier spacing with a longer CP helps preserve orthogonality between NB IoT UEs when the timing advance accuracy is poor, it does not preserve orthogonality with UEs using neighboring LTE physical resource blocks (PRBs).

Multi-user multicarrier systems which allow a mixture of broadband devices and narrowband IoT devices have been recently proposed in the 3GPP and Institute of Electrical and Electronics Engineers (IEEE) standard setting organizations. These systems are highly flexible in order to accommodate various requirements (e.g. throughput, latency, etc.) of a multitude of devices that may need to share the spectrum of the corresponding system. For example, IoT devices (e.g. a sensor) and broadband devices (e.g. a personal computer) have different requirements regarding battery consumption and throughput.

Many IoT devices will be battery operated (e.g., powered by a coin cell battery) and are intended to have long lifetimes, up to several years. Extended coverage is another common requirement for IoT devices, since many devices such as utility meters may be located in places where the penetration loss is high. For these reasons, power efficient modulation is desirable, especially when used at the IoT device transmitter. In particular, the use of constant envelope modulation is advantageous in IoT applications.

In order to tackle energy efficiency and coverage extension problems, NB-IoT proposes the use of a single sub-carrier. Such use achieves constant envelope modulation, and allows boosting of the power for the single tone used. A single carrier, linear modulator may be used to modulate a signal on a single sub-carrier such as described in FIG. 9. In FIG. 9, information bits are mapped to complex-valued constellation symbols ($a_k$) that are modulated by an impulse train $$\left(\sum_n \delta(t-n\tau)\right)$$

to obtain a modulated signal $$x(t) = \sum_k a_k p(t-k\tau).$$

A pulse shaping filter ($p(\cdot)$) filters the modulated signal to obtain a single carrier, linearly modulated signal. The pulse shaping filter ($p(\cdot)$) determines the bandwidth of the modulated signal and, more generally, its spectral characteristics. The symbol period determines the rate at which the information bearing constellation symbols are transmitted.

Broadband devices on a multi-user multicarrier system may use an OFDM transmitter and/or receiver such as described in FIGS. 10 and 11, respectively. The subcarrier spacing $\Delta f$ is a basic OFDM system parameter. The total number of subcarriers is N, but not necessarily all the subcarriers are used. The numbers $0 \le k_0 < k_1 < \ldots < k_{M-1} \le N-1$ are the subcarrier numbers, which determine the center of frequency of each subcarrier. The code bits are mapped to complex-valued constellation symbols $(b_{k_m})_{m=0}^{M-1}$, usually called frequency domain symbols. Both the transmitter and receiver are commonly implemented digitally using a Fast Fourier Transform (FFT).

There have been contributions to the IEEE 802.11ax task group proposing to include the use of single carrier modulation with constant envelope and, in particular, the use of single carrier signals that are orthogonal to OFDM signals. IEEE is currently finalizing the 802.11ax amendment to the 802.11 standard. This technology is primarily intended for broadband devices. It focuses on high efficiency and introduces the use of Orthogonal Frequency Division Multiple Access (OFDMA). On the other hand, there is a realization in the Wi-Fi community that it would be useful to multiplex narrowband IoT devices together with other devices in the 2.4 GHz and five (5) GHz ISM frequency bands. Thus, there are proposals to enhance the scope of IEEE 802.11ax to handle IoT devices, allowing for multi-mode base station subsystems (BSSs). As is common in IEEE, re-use of existing technology components and low complexity receivers are encouraged. Also, the data rates for the IoT devices are not expected to be too low, as relatively high data rates are seen as a competitive advantage with respect to other IoT technologies such as Bluetooth Low Energy (BLE).

Accordingly, there is a need for improved techniques for performing data transmission and reception in a communication system such as an NB-IoT system. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of this disclosure and is not intended to identify key/critical elements of embodiments of this disclosure or to delineate the scope of this disclosure. The sole purpose of this summary is to present some concepts disclosed herein in a simplified form as a prelude to the more detailed description that is presented later.

Briefly described, embodiment of the present disclosure relate to performing data transmission and reception in a communication system. This disclosure describes systems and methods to create memoryless linearly modulated, single carrier signals that are orthogonal to OFDM signals. Further, this disclosure describes that any linearly modulated signal that is orthogonal to an OFDM signal may be generated by the systems and methods described herein. This disclosure also describes systems and methods of single carrier, linearly modulated signals that are approximately orthogonal to OFDM signals, but which have desirable properties such as short pulse shaping filters (the length of the filter is measured in time units, e.g. usec.) or steep spectral decay.

According to another aspect, this disclosure describes allowing frequency domain multiplexing of any mix of IoT and broadband devices, while fulfilling one or more conditions. First, such multiplexing may allow for the full use of the available bandwidth with no guard bands or null sub-carriers required. Second, energy efficiency or coverage extension may be achieved by means of power efficient, constant or near constant envelope modulations, which is beneficial for IoT transmitters and may be realized by means of single sub-carrier modulation. Third, such multiplexing may provide a flexible choice of data rates for all users, including IoT devices constrained to use a single sub-carrier. Fourth, a single-FFT OFDMA receiver architecture may be re-used. In fact, a single FFT over the whole band may be sufficient to separate the multiple users while yielding sufficient statistics for the user data. The use of a single FFT provides for low complexity, power efficient multi-user receivers. Fifth, such multiplexing allows for a flexible design of single-carrier waveforms in order to fulfill data rate, passband, stop band, spectrum decay and other desired characteristics.

According to another aspect, this disclosure describes an OFDMA system where some users are allowed to use single carrier, linearly modulated signals sharing the same frequency band as OFDM users, under the constraint of being orthogonal (or near-orthogonal) in the frequency domain with respect to the other users in the system. Moreover, orthogonality may be ensured by applying one or more improvements. First, the pulse shaping filter may be extended periodically to a periodic function of time with period equal to the OFDM symbol duration and guaranteeing that Fourier series coefficients of the periodically extended pulse shaping filter corresponding to the tones used by the other users in the OFDMA system are zero, or alternatively small in magnitude, in which case near-orthogonality is obtained. Second, periodicity may be introduced in the single carrier, linearly modulated signals so that these signals are periodic over time intervals of the length of the OFDM symbols. Third, the OFDM signals may be aligned in time so that any segments of the OFDM signals and of the single carrier signals with a duration equal to the OFDM symbol length appears periodic in time if the starting time is chosen to lie within the cyclic prefix of an OFDM symbol.

According to another aspect, the Fourier series coefficients of the periodically extended the pulse shaping filter which do not correspond to tones equal to the subcarrier frequencies employed by other users may be chosen to satisfy bandwidth requirements, spectrum requirements.

According to another aspect, the center frequency of the single-carrier signals may be chosen according to the application, bandwidth occupancy and need not coincide with the OFDM subchannel raster. In other words, it need not be equal to the center frequency of an OFDM subcarrier.

According to another aspect, a receiver in a base station may be configured to receive signals from multiple users by using a single DFT to separate, in the frequency domain, each user signal, including single-carrier user signals. Further, the single-carrier, linearly modulated signals assigned a center of frequency at the band edge or guard band of the OFDMA system may have asymmetric spectra, satisfying frequency domain orthogonality (or near-orthogonality) conditions with respect the other users on one side of its center of frequency, and spectrum mask constraints on the other side of its center of frequency.

According to one aspect, a method performed by a wireless device for transmitting a signal in a first communication system that is frequency-domain multiplexed with a second communication system may include generating, by a modulator of the wireless device, a modulated signal that represents one or more information symbols. Further, the modulated signal may include one or more modulation symbols of the first system with each modulation symbol having certain characteristics. First, these characteristics may include a period that corresponds to a symbol rate of the second system. Second, these characteristics may include a starting time such that the modulation symbol starts in a cyclic prefix interval of modulation symbols of the second system. In one example, the modulation symbol as transmitted may start in a cyclic prefix interval of the modulation symbols of the second system. In another example, the modulation symbol as received may start in a cyclic prefix interval of the modulation symbols of the second system. Third, these characteristics may include a duration that is equal to or less than a duration of one modulation symbol of the second system. The method may also include filtering, by a pulse shaping filter of the wireless device, the modulated signal to obtain the filtered modulated signal. The pulse shaping filter may be configured to operate with a period that corresponds to the symbol rate of the second system and may have a frequency response that reduces a magnitude of the modulated signal at a frequency of at least one carrier or sub-carrier of a signal transmitted in the second system. In addition, the method may include transmitting, by a transmitter of the wireless device, the filtered modulated signal at a carrier or sub-carrier frequency of the first system that is different from a carrier or sub-carrier frequency of the second system.

According to another aspect, the first system may use single-carrier, linear modulation and the second system may use orthogonal frequency division multiplexing (OFDM).

According to another aspect, each modulation symbol of the first system may be aligned in time with a modulation symbol of the second system.

According to another aspect, the method may include determining a carrier frequency of the filtered modulated signal. Further, the step of transmitting may include transmitting the filtered modulated signal at the carrier frequency.

According to another aspect, the method may include adjusting the carrier frequency to compensate for a decay in magnitude in a guard band of the second system. Also, the carrier frequency may be in the guard band of the second system.

According to another aspect, the step of determining the carrier frequency of the filtered modulated signal may be based on a data bandwidth requirement of the wireless device.

According to another aspect, the carrier frequency may be in a guard band of the second system.

According to another aspect, the carrier frequency may be at or adjacent to an edge of a frequency band of the second system.

According to another aspect, the carrier frequency may be between two adjacent sub-carriers of the second system.

According to another aspect, the carrier frequency may be about an arithmetic mean between the two adjacent sub-carriers of the second system.

According to another aspect, the carrier frequency may be in a non-active sub-carrier of the second system.

According to another aspect, the carrier frequency may be in an active sub-carrier of the second system.

According to another aspect, the pulse shaping filter may have a frequency response that includes a null that corresponds to a frequency of at least one carrier or sub-carrier of a signal transmitted in the second system.

According to another aspect, the pulse shaping filter may be a finite impulse response (FIR) filter that includes a zero on or adjacent to the unit circle of a pole-zero diagram so as to dampen a magnitude at a frequency of at least one carrier or sub-carrier of a signal transmitted in the second system.

According to another aspect, the modulated signal may have about a constant envelope.

According to another aspect, a bandwidth of the first system may be less than a bandwidth of the second system.

According to another aspect, the modulated signal may be a narrowband Internet of Things (NB-IoT) signal.

According to another aspect, the first system may be a narrowband Internet of Things (NB-IoT) system and the second system may be a wideband orthogonal frequency division multiplexing (OFDM) system.

According to another aspect, the pulse shaping filter may be an asymmetric filter having an asymmetric frequency response. Further, the pulse shaping filter may be configured to, on one side of a center frequency of the pulse shaping filter, compensate for a decay in magnitude in a guard band of the second system. Also, the pulse shaping filter may be configured to, on the other side of the center frequency, provide substantial orthogonality in the frequency domain for carriers or sub-carriers in the second system.

According to another aspect, the carrier or sub-carrier frequency of the second system may correspond to a carrier or sub-carrier frequency in-band of the second system. Further, the carrier or sub-carrier frequency in-band of the second system may be used or not-used by the second system.

According to one aspect, a wireless device for transmitting a signal in a first communication system that is frequency-domain multiplexed with a second communication system may include a processor and a memory. The memory contains instructions executable by the processor whereby the wireless device may be configured to generate a modulated signal that represents one or more information symbols. Further, the modulated signal may include one or more modulation symbols of the first system with each modulation symbol having certain characteristics. First, these characteristics may include a period that corresponds to a symbol rate of the second system. Second, these characteristics may include a starting time such that the modulation symbol starts in a cyclic prefix interval of modulation symbols of the second system. The wireless device via the executable instructions may be configured to filter, by a pulse shaping filter of the wireless device, the modulated signal to obtain the filtered modulated signal. The pulse shaping filter may be configured to operate with a period that corresponds to the symbol rate of the second system and may have a frequency response that reduces a magnitude of the modulated signal at a frequency that corresponds to a frequency of at least one carrier or sub-carrier of a signal transmitted in the second system. In addition, the wireless device via the executable instructions may be configured to transmit the filtered modulated signal at a carrier or sub-carrier frequency of the first system that is different from a carrier or sub-carrier frequency of the second system.

According to one aspect, a method performed by a wireless device for receiving a signal in a first communication system that is frequency-domain multiplexed with a second communication system may include receiving, by a receiver of the wireless device, at a carrier or sub-carrier frequency of the first system that is different from a carrier or sub-carrier frequency of the second system, a modulated signal that represents one or more information symbols. Further, the modulated signal may include one or more modulation symbols of the first system with each modulation symbol having certain characteristics. First, these characteristics may include a period that corresponds to a symbol rate of the second system. Second, these characteristics may include a starting time such that the modulation symbol starts in a cyclic prefix interval of modulation symbols of the second system. Third, these characteristics may include a duration that is equal to or less than a duration of one modulation symbol of the second system. In addition, the method may include demodulating, by a demodulator of the wireless device, the modulated signal to obtain information symbols.

According to another aspect, the receiving step may include receiving a combined signal that includes the modulated signal of the first system and a modulated signal of the second system. Further, the demodulating step may include performing a single discrete Fourier transform (DFT) on the combined signal to obtain the information symbols associated with the modulated signal of the first system and information symbols associated with the modulated signal of the second system.

According to another aspect, the demodulating step may include using a DFT circuit. Further, a single DFT circuit may be used to demodulate at least one of the modulated signal of the first system and a modulated signal of the second system.

According to one aspect, a wireless device for receiving a signal in a first communication system that is frequency-domain multiplexed with a second communication system may include a processor and a memory. Further, the memory contains instructions executable by the processor whereby the wireless device may be configured to receive, at a carrier or sub-carrier frequency of the first system that is different from a carrier or sub-carrier frequency of the second system, a modulated signal that represents one or more information symbols. The modulated signal may include one or more modulation symbols of the first system with each modulation symbol having certain characteristics. In addition, the wireless device via the executable instructions may demodulate the modulated signal to obtain information symbols.

BRIEF DESCRIPTION OF THE DRAWINGS

The present disclosure will now be described more fully hereinafter with reference to the accompanying drawings, in which embodiments of this disclosure are shown. However, this disclosure should not be construed as limited to the embodiments set forth herein. Rather, these embodiments are provided so that this disclosure will be thorough and complete, and will fully convey the scope of this disclosure to those skilled in the art. Like numbers refer to like elements throughout.

FIG. 3 shows one embodiment of a method of performing data reception in a communication system in accordance with various aspects as described herein.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Figure 1:
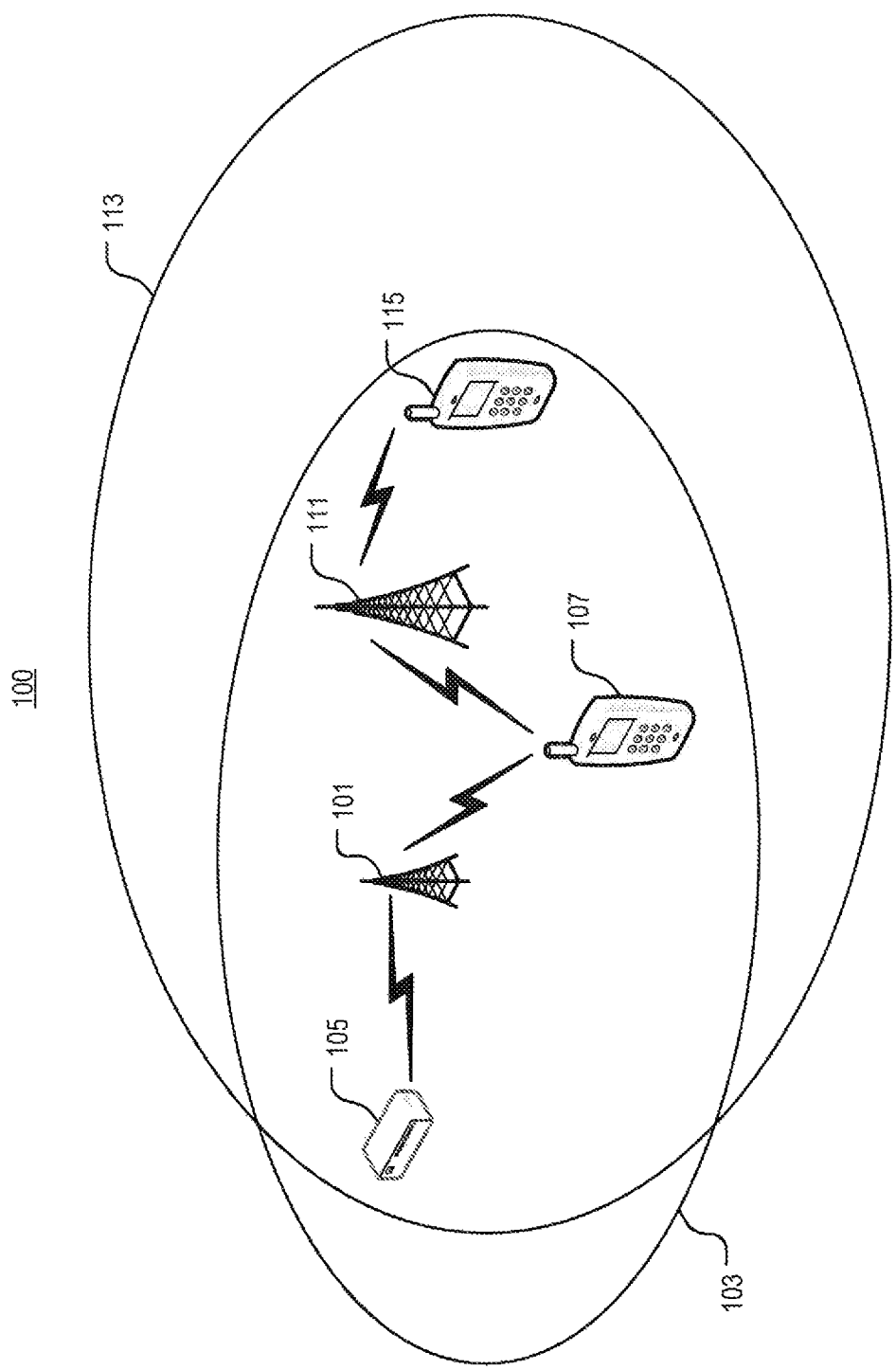
FIG. 1 illustrates one embodiment of a system for performing data transmission and reception in a communication system in accordance with various aspects as described herein.

This disclosure includes describing systems and methods of performing data transmission and reception in a communication system. For instance, FIG. 1 illustrates one embodiment of a system 100 for performing data transmission and reception in a communication system in accordance with various aspects as described herein. In FIG. 1, the system 100 may include a first base station 101 in a first communication system 103 and a second base station 111 in a second communication system 113. The first communication system 103 may be a narrowband system such as a narrowband single-carrier system and the second communication system 113 may be a broadband system such as a broadband OFDM system. For instance, the first communication system 103 may be a narrowband IoT system and the second communication system 113 may be a broadband LTE system, a 5G New Radio (NR) system, or the like. The first communication system 103 and the second communication system 113 may be frequency domain multiplexed to allow wireless devices in each system to communicate while sharing frequency spectrum. For instance, a frequency band of the first communication system 103 may be in a frequency band of the second communication system 113 such as in an in-band or a guard-band of the second communication system 113. The first base station 101 may be configured to communicate with other wireless devices in the first communication system 103. Also, the second base station 111 may be configured to communicate with other wireless devices in the first communication system 103 and the second communication system 113.

In FIG. 1, a first wireless device 105 may be served by the first base station 101. In one example, the first wireless device 105 may be an M2M device. A second wireless device 107 may be served by the first base station 101 or the second base station 111. The second wireless device 107 may be a multi-mode wireless device configured to operate in both the first communication system 103 and the second communication system 113. A third wireless device 115 may be served by the second base station 111. The third wireless device 115 may be configured to operate in the second communication system 113.

In the current embodiment, the first wireless device 105 may transmit a signal to the first base station 101 in the first communication system 103. Further, the transmitted signal by the first wireless device 105 may be multiplexed with transmitted signals by the second and third wireless devices 107 and 115 in the second communication system 113. To transmit the signal to the first base station 101 in the first communication system 103, the first wireless device 105 may generate a modulated signal that includes one or more modulation symbols of the first communication system 103 having certain characteristics associated with modulation symbols of the second communication system 113. For instance, each modulation symbol of the first communication system 103 may include at least one of: a period that corresponds to a symbol rate of the second communication system 113, a duration that is equal to or less than one modulation symbol of the second communication system 113, and a starting time such that the modulation symbol starts in a cyclic prefix interval of modulation symbols of the second communication system 113. Further, the first wireless device 105 may filter the modulated signal using a pulse shaping filter with certain characteristics associated with the second communication system 113. For instance, the pulse shaping filter may be configured to operate with a period that corresponds to the symbol rate of the second communication system 113. Further, the pulse shaping filter may have a frequency response that reduces a magnitude of the modulated signal at a frequency that corresponds to a frequency of at least one carrier or sub-carrier of a signal transmitted in the second communication system 113. In addition, the first wireless device 105 may transmit the filtered modulated signal at a carrier or sub-carrier frequency of the first communication system 103 that is different from a carrier or sub-carrier frequency of the second communication system 113.

In FIG. 1, the first wireless device 105 may receive a modulated signal transmitted by the first base station 101. The modulated signal may be transmitted using a carrier or sub-carrier frequency of the first communication system that is different from a carrier or sub-carrier frequency of the second communication system. Further, the modulated signal may include modulation symbols of the first communication system that have characteristics associated with modulation symbols of the second communication system. For instance, each modulation symbol of the first communication system may include at least one of: a period that corresponds to a symbol rate of the second communication system, a duration that is equal to or less than one modulation symbol of the second communication system, and a starting time such that the modulation symbol in a cyclic prefix interval of modulation symbols of the second communication system. In addition, the first wireless device 105 may demodulate the first modulated signal to obtain information symbols.

In this embodiment, the second base station 111 may receive a combined signal having a first modulated signal transmitted by the second wireless device 107 in the first communication system 103 and a second modulated signal 113 transmitted by the third wireless device 115 in the second communication system 113. The first modulated signal may be transmitted using a carrier or sub-carrier frequency of the first communication system 103 that is different from a carrier or sub-carrier frequency of the second communication system 113. Further, as previously described, the first modulated signal may include modulation symbols of the first communication system 103 that have characteristics associated with modulation symbols of the second communication system 113. Since orthogonality is substantially maintained between the received modulated signals of the first communication system 103 and the second communication system 103, the first base station 105 may demodulate the first modulated signal of the first communication system 103 and may demodulate the second modulated signal of the second communication system 113.

Figure 2:
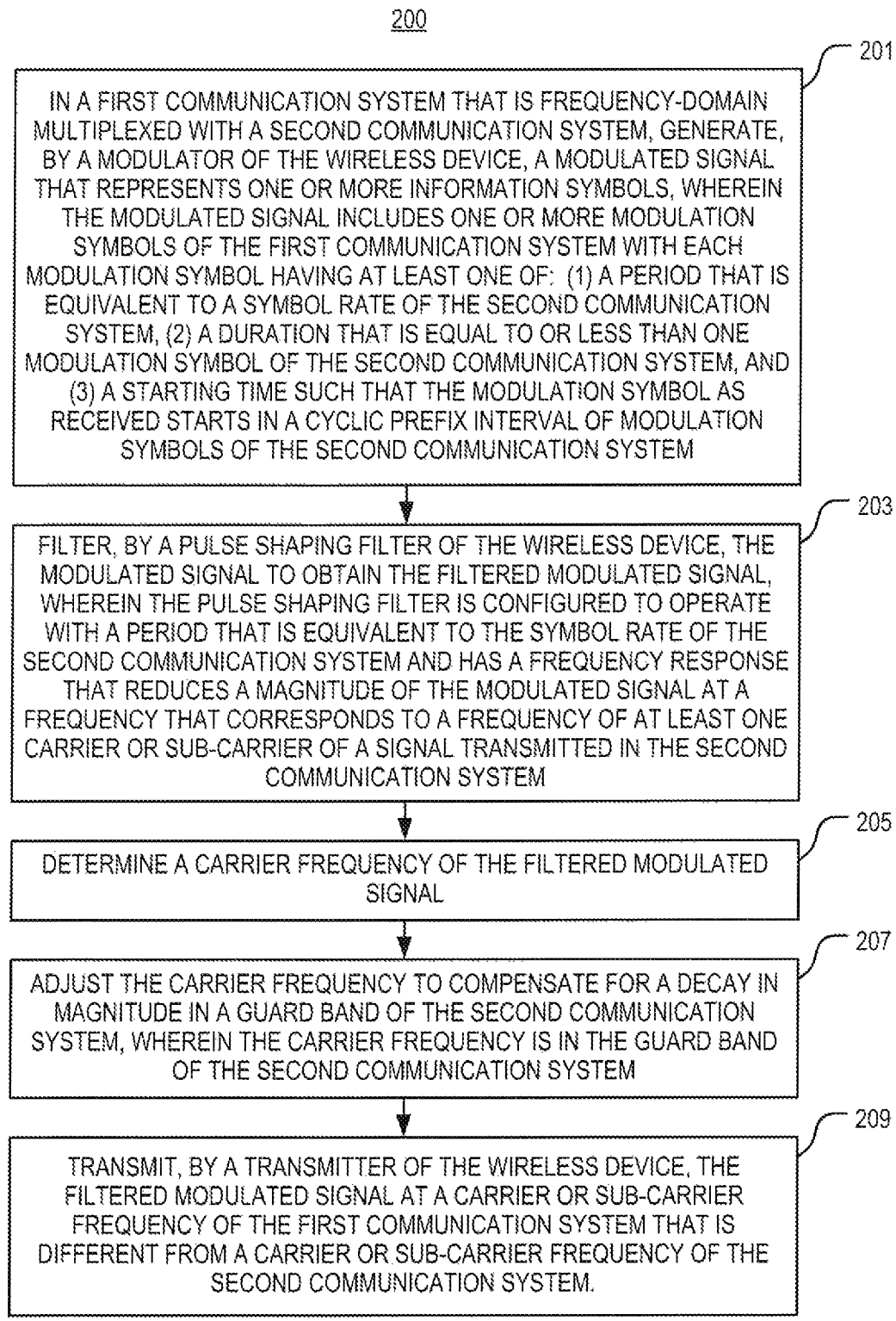
FIG. 2 shows one embodiment of a method of performing data transmission in a communication system in accordance with various aspects as described herein.

FIG. 2 shows one embodiment of a method 200 of performing data transmission in a communication system in accordance with various aspects as described herein. In FIG. 2, the method 200 may start, for instance, at block 201 where it may include, in a first communication system that is frequency-domain multiplexed with a second communication system, generating a modulated signal that represents one or more information symbols. The modulated signal may include one or more modulation symbols of the first communication system with each modulation symbol having at least one of: (1) a period that corresponds to a symbol rate of the second communication system, (2) a duration that is equal to or less than one modulation symbol of the second communication system, and (3) a starting time such that the modulation symbol starts in a cyclic prefix interval of modulation symbols of the second communication system. At block 203, the method 200 may include filtering, by a pulse shaping filter of the wireless device, the modulated signal to obtain the filtered modulated signal. The pulse shaping filter may be configured to operate with a period that corresponds to the symbol rate of the second communication system and has a frequency response that reduces a magnitude of the modulated signal at a frequency that corresponds to a frequency of at least one carrier or sub-carrier of a signal transmitted in the second communication system.

In FIG. 2, at block 205, the method 200 may include determining a carrier frequency of the filtered modulated signal. At block 207, the method 200 may include adjusting the carrier frequency to compensate for a decay in magnitude in a guard band of the second communication system. The carrier frequency may be in the guard band of the second communication system. At block 209, the method 200 may include transmitting the filtered modulated signal at a carrier or sub-carrier frequency of the first communication system that is different from a carrier or sub-carrier frequency of the second communication system.

FIG. 3 shows one embodiment of a method 300 of performing data reception in a communication system in accordance with various aspects as described herein. In FIG. 3, the method 300 may be performed by a wireless device in a first communication system that is frequency-domain multiplexed with a second communication system. The method 300 may start, for instance, at block 301 where it may include receiving, at a carrier or sub-carrier frequency of the first communication system that is different from a carrier or sub-carrier frequency of the second communication system, a modulated signal that represents one or more information symbols. The modulated signal may include one or more modulation symbols of the first communication system. Further, each modulation symbol of the first communication system may have at least one of: (a) a period that corresponds to a symbol rate of the second communication system, (2) a duration that is equal to or less than one modulation symbol of the second communication system, and (3) a starting time such that the modulation symbol starts in a cyclic prefix interval of modulation symbols of the second communication system. At block 303, the method 300 may include demodulating the modulated signal to obtain information symbols.

Figure 4:
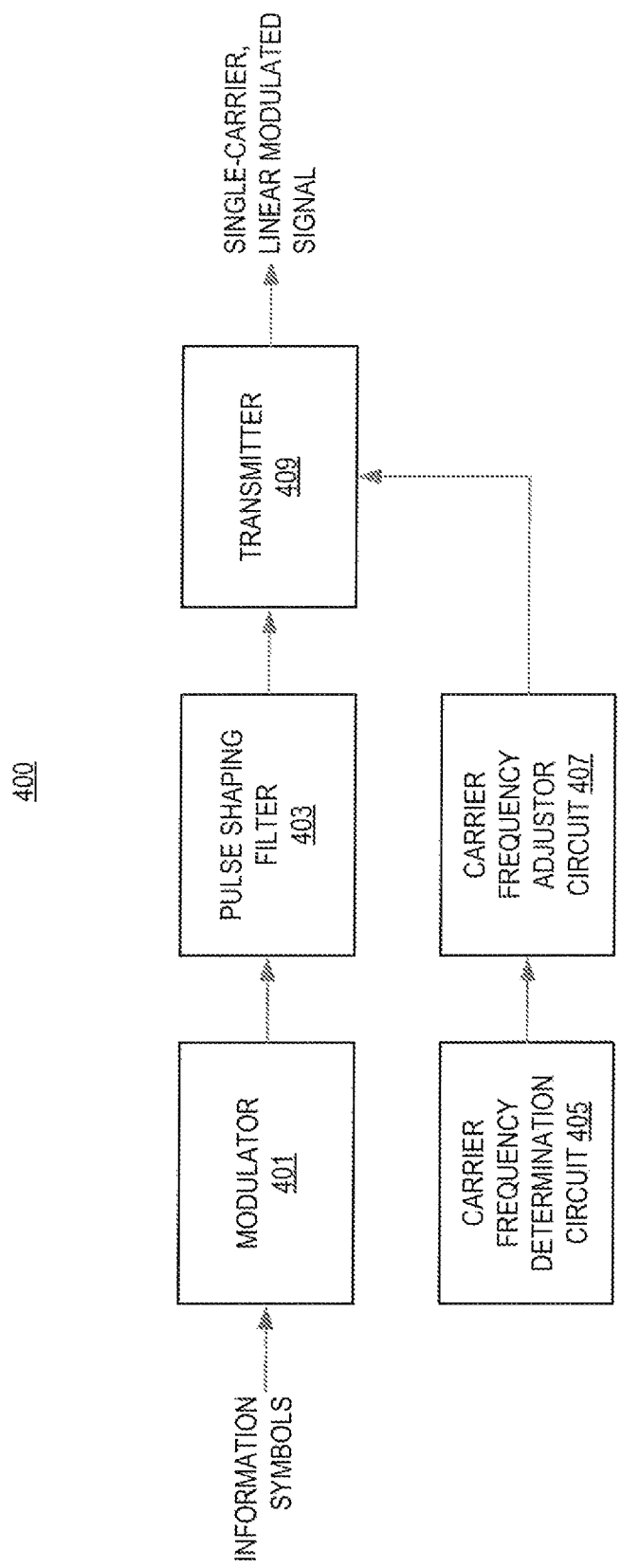
FIG. 4 shows one embodiment of a system for performing data transmission in a communication system in accordance with various aspects as described herein.

FIG. 4 shows one embodiment of a system 400 for performing data transmission in a first communication system in accordance with various aspects as described herein. The system 400 may include a modulator 401, a pulse-shaping filter 403, a carrier frequency determination circuit 405, a carrier frequency adjustor circuit 407, a transmitter 409, another circuit, or any combination thereof. The modulator 401 may be configured to generate a modulated signal that represents one or more information symbols. Further, the modulated signal may include one or more modulation symbols of the first communication system. Each modulation symbol may have a certain period, duration or starting time associated with a second communication system. For instance, the certain period may be equivalent to a symbol rate of a second communication system. Further, the certain duration may be equal to or less than one modulation symbol of the second communication system. Also, the certain starting time may be such that the modulation symbol starts in a CP interval of modulation symbols of the second communication system.

In FIG. 4, the pulse shaping filter 403 may be configured to filter the modulated signal. Further, the pulse shaping filter 403 may be configured to operate with a period that corresponds to the symbol rate of the second communication system. Also, the pulse shaping filter 403 may be configured to operate with a frequency response that reduces a magnitude of the modulated signal at a frequency that corresponds to a frequency of at least one carrier or sub-carrier of a signal transmitted in the second communication system. The carrier frequency determination circuit 405 may be configured to determine a carrier frequency of the filtered modulated signal. The carrier frequency of the filtered modulated signal may be in a guard band of the second communication system. The carrier frequency adjustor circuit 407 may be configured to adjust the carrier frequency of the filtered modulated signal to compensate for a decay in magnitude in the guard band of the second communication system. In addition, the transmitter may be configured to transmit the filtered modulated signal at a carrier or sub-carrier frequency of the first communication system that is different from a carrier or sub-carrier frequency of the second communication system. Also, the transmitted signal may be a single-carrier, linear modulated signal.

Figure 5A:
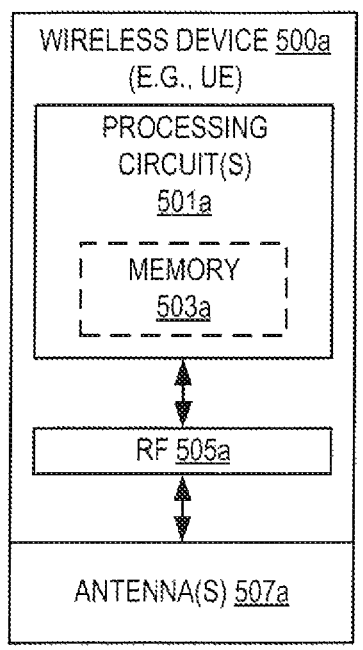
FIGS. 5A-B show other embodiments of a wireless device for performing data transmission in a communication system in accordance with various aspects as described herein.

FIG. 5A shows another embodiment of a wireless device 500a for performing data transmission in a communication system in accordance with various aspects as described herein. In FIG. 5A, the wireless device 500a may include one or more processing circuits 501a, radio frequency (RF) circuitry 505a and one or more antennas 507a. The RF circuitry 505a in combination with the one or more antennas may be configured to transmit/receive information to/from one or more network nodes (i.e., via any communication technology). The one or more antennas 507a may be internal or external to the wireless device 500a. The processing circuits 501a may be configured to perform processing as described herein (e.g., the method of FIGS. 2 and 3) such as by executing instructions stored in memory 503a. The processing circuits in this regard may implement certain functional means, units or modules.

Figure 5B:
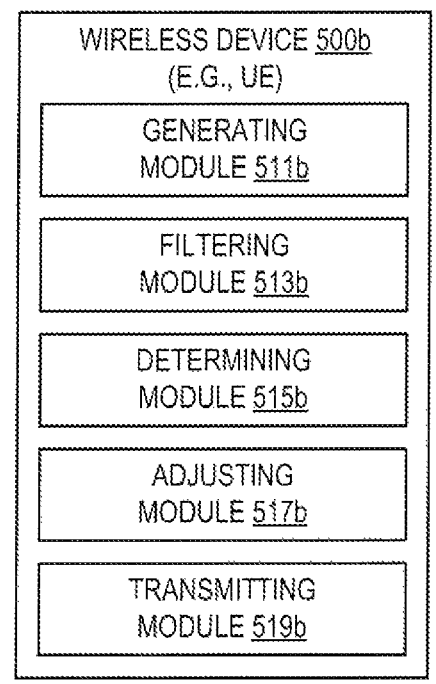

FIG. 5B shows another embodiment of a wireless device 500b implemented in accordance with one or more embodiments described herein. As shown, the wireless device 500b implements various functional means, units or modules (e.g., via the processing circuitry 501a in FIG. 5A and/or via software code). These functional means, units or modules (e.g., for implementing the method in FIG. 2) may include a generating unit or module 511b, a filtering unit or module 513b, a carrier frequency determining unit or module 515b, a carrier frequency adjusting unit or module 517b, a transmitting unit or module 519b, another unit or module, or any combination thereof. The generating unit or module 515b may be for generating a modulated signal that represents one or more information symbols. The modulated signal may include one or more modulation symbols of a first communication system. Further, each modulation symbol may have a certain period, duration or starting time. For instance, the certain period may be equivalent to a symbol rate of a second communication system. The filtering unit or module 513b may be for filtering the modulated signal to obtain the filtered modulated signal. The filtering unit or module 513b may implement a pulse shaping filter that is configured to operate with a period that corresponds to the symbol rate of the second communication system.

In FIG. 5B, the pulse shaping filter may have a frequency response that reduces a magnitude of the modulated signal at a frequency that corresponds to a frequency of a carrier or sub-carrier of a signal transmitted in the second communication system. The carrier frequency determining unit or module 515b may be for determining a carrier frequency of the filtered modulated signal. Also, the carrier frequency adjusting unit or module 517b may be for adjusting the carrier frequency to compensate for a decay in magnitude in a guard band of the second communication system. The carrier frequency may be in the guard band of the second communication system. In addition, the transmitting unit or module 519b may be for transmitting the filtered modulated signal at a carrier or sub-carrier frequency of the first communication system that is different from a carrier frequency of the second communication system.

Figure 6:
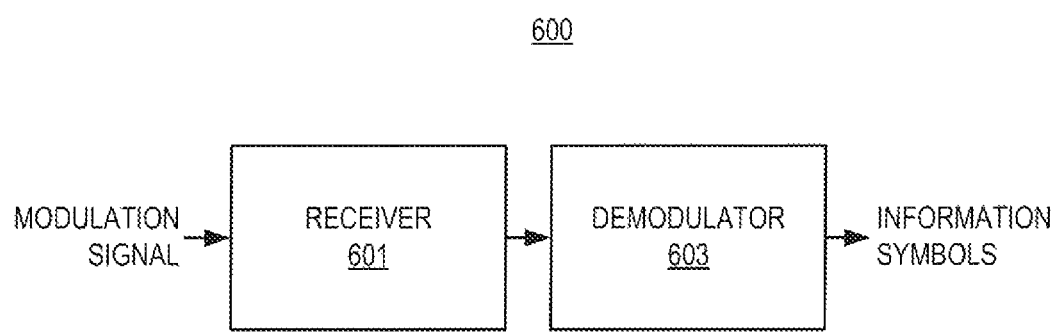
FIG. 6 shows one embodiment of a system for performing data transmission in a communication system in accordance with various aspects as described herein.

FIG. 6 shows one embodiment of a system 600 for performing data transmission in a communication system in accordance with various aspects as described herein. The system 600 may include a receiver 601, a demodulator 603, another circuit, or any combination thereof. The receiver 601 may be configured to receive at a carrier or sub-carrier frequency of a first communication system, a modulated signal that represents one or more information symbols. Further, the carrier or sub-carrier frequency of the first communication system may be different from a carrier or sub-carrier frequency of a second communication system. Also, the modulating signal may include one or more modulation symbols of the first communication system. Each modulation symbol may have a certain period, duration or starting time associated with the second communication system. For instance, the certain period may be equivalent to a symbol rate of the second communication system. Further, the certain duration may be equal to or less than one modulation symbol of the second communication system. Also, the certain starting time may be a starting time such that the modulation symbol starts in a CP interval of modulation symbols of the second communication system. The demodulator 603 may be configured to demodulate the modulated signal to obtain information bits.

Figure 7:
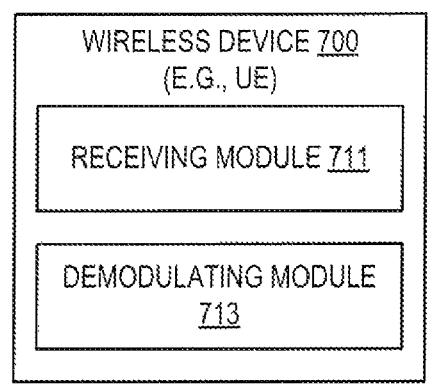
FIG. 7 shows another embodiment of a wireless device for performing data transmission in a communication system in accordance with various aspects as described herein.

FIG. 7 shows another embodiment of a wireless device 700 implemented in accordance with one or more embodiments described herein. As shown, the wireless device 700 implements various functional means, units or modules (e.g., via the processing circuitry 501a in FIG. 5A and/or via software code). These functional means, units or modules (e.g., for implementing the method in FIG. 3) may include a receiving unit or module 711, a demodulating unit or module 713, another unit or module, or any combination thereof. The receiving unit or module 711 may be for receiving, at a carrier or sub-carrier frequency of a first communication system that is different from a carrier or sub-carrier frequency of a second communication system, a modulated signal that represents one or more information symbols. Further, the carrier or sub-carrier frequency of the first communication system may be different from a carrier or sub-carrier frequency of a second communication system. Also, the modulating signal may include one or more modulation symbols of the first communication system. Each modulation symbol may have a certain period, duration or starting time associated with the second communication system. For instance, the certain period may be equivalent to a symbol rate of the second communication system. Further, the certain duration may be equal to or less than one modulation symbol of the second communication system. Also, the certain starting time may be a starting time such that the modulation symbol starts in a CP interval of modulation symbols of the second communication system. The demodulating unit or module 713 may be configured to demodulate the modulated signal to obtain information bits.

Figure 8:
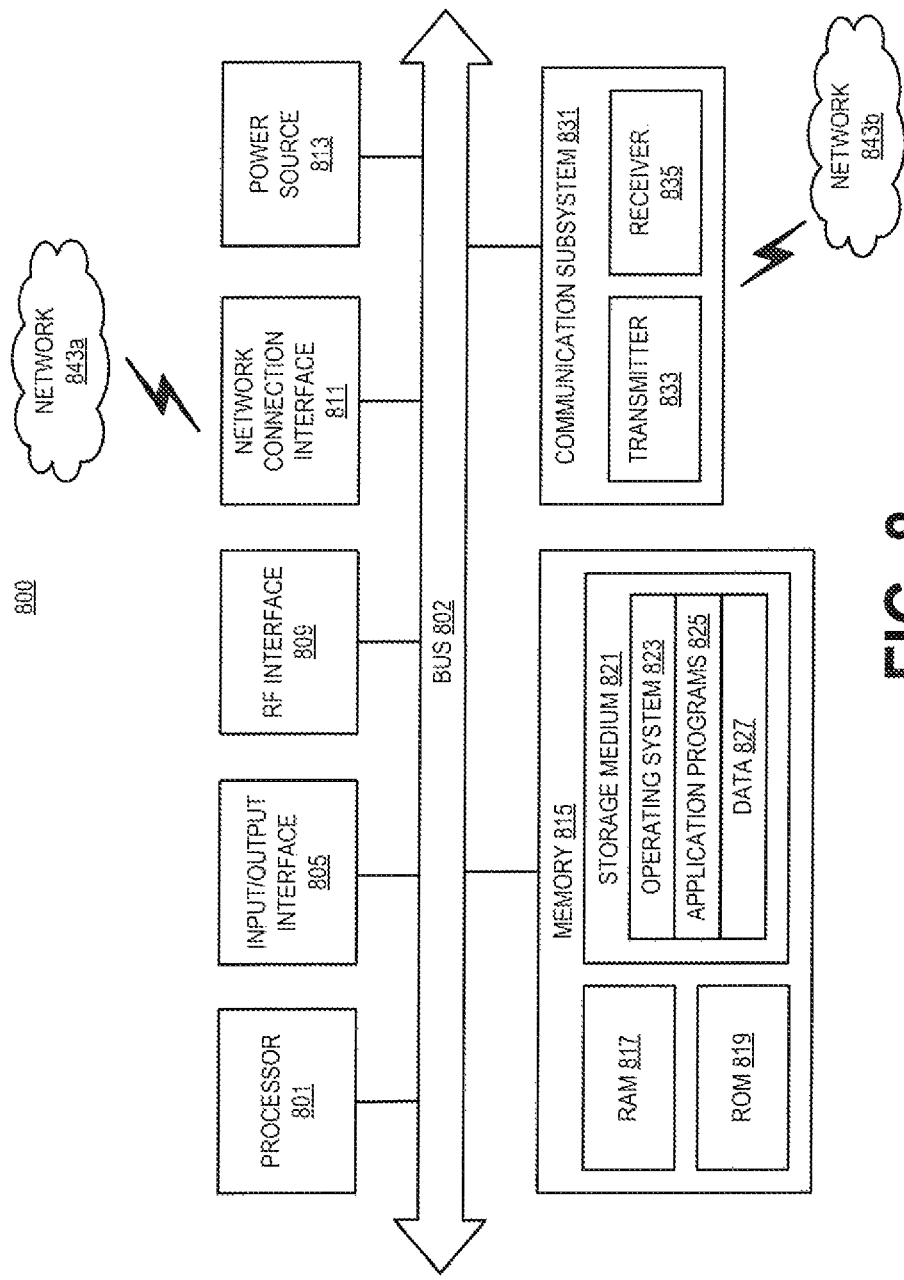
FIG. 8 illustrates another embodiment of a wireless device in accordance with various aspects as described herein.
Figure 9:
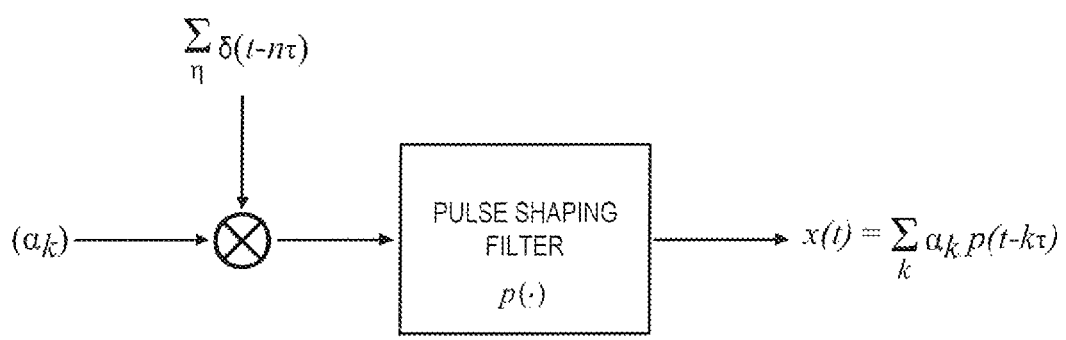
FIG. 9 shows a system for performing data transmission in a communication system.
Figure 10:
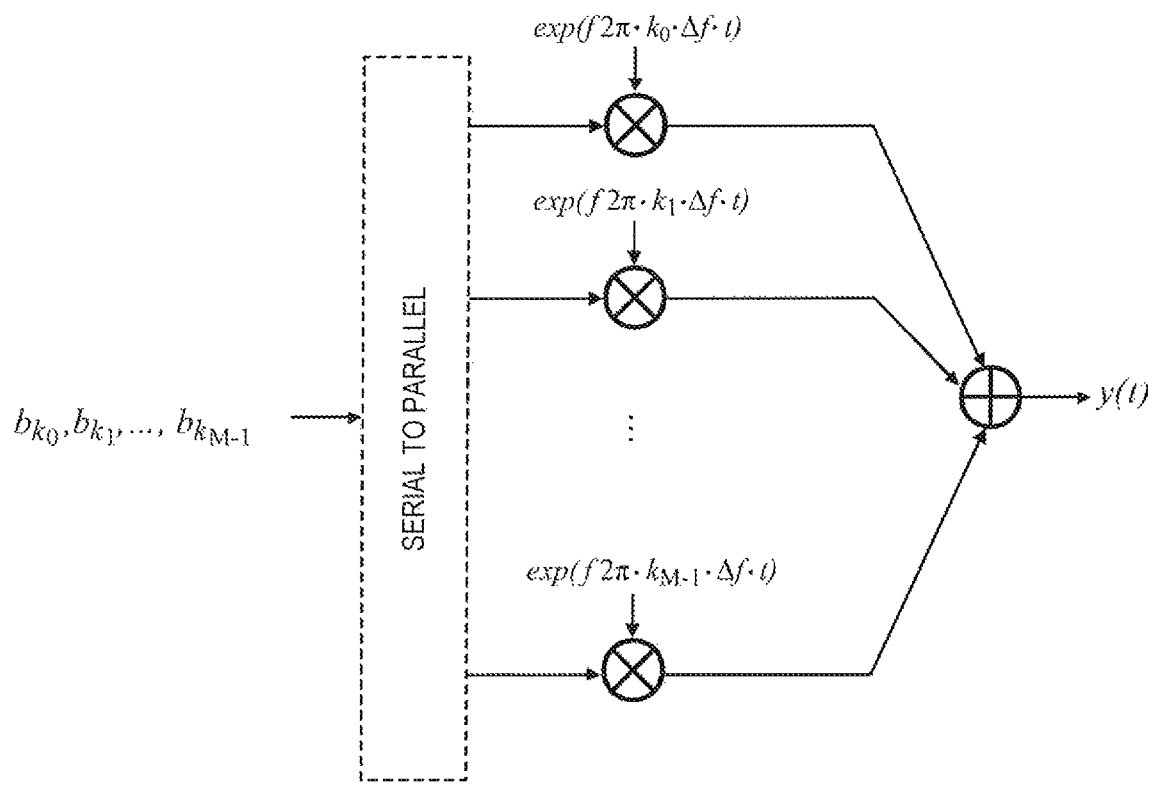
FIG. 10 shows a system for performing data transmission in a communication system.
Figure 11:
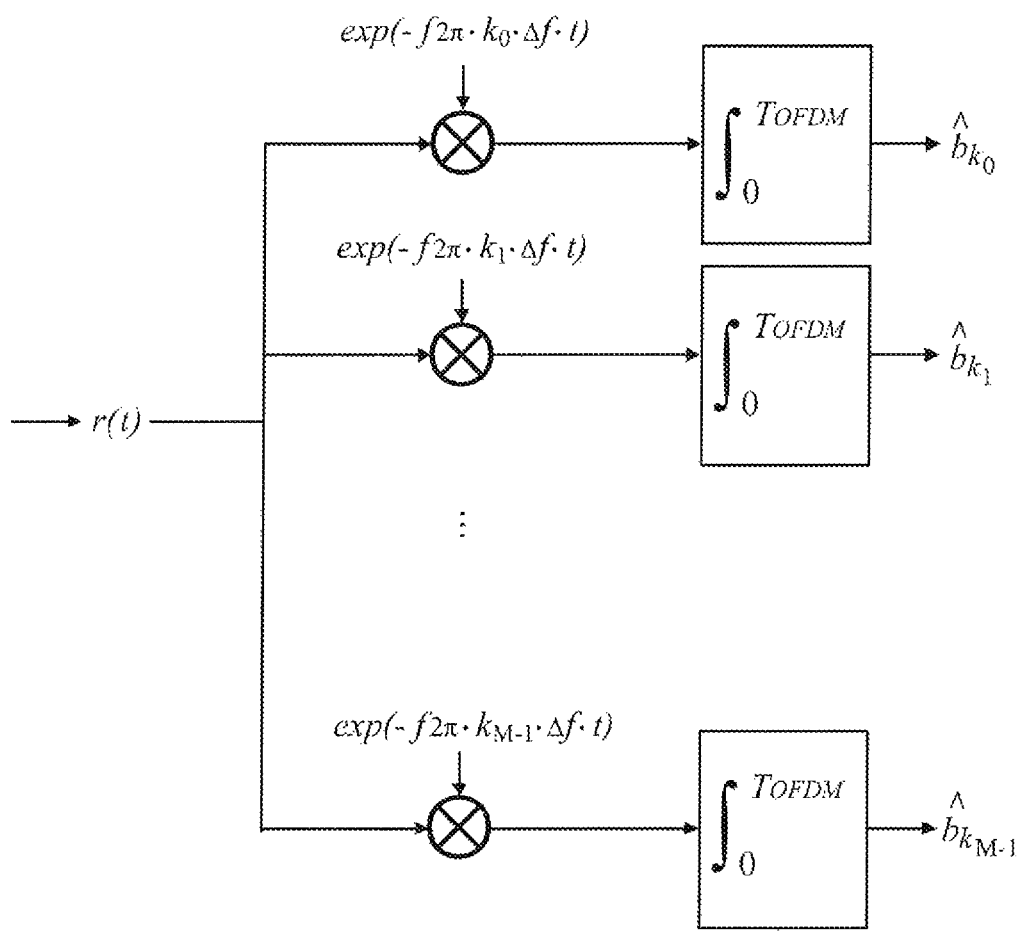
FIG. 11 shows a system for performing data reception in a communication system.

FIG. 8 illustrates one embodiment of a wireless device 800 in accordance with various aspects as described herein. In some instances, the wireless device 800 may be referred as a network node, a base station (BS), an access point (AP), a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or some other like terminology. In other instances, the wireless device 800 may be a set of hardware components. In FIG. 8, the wireless device 800 may be configured to include a processor 801 that is operatively coupled to an input/output interface 805, a radio frequency (RF) interface 809, a network connection interface 811, a memory 815 including a random access memory (RAM) 817, a read only memory (ROM) 819, a storage medium 821 or the like, a communication subsystem 831, a power source 813, another component, or any combination thereof. The storage medium 821 may include an operating system 823, an application program 825, data 827, or the like. Specific devices may utilize all of the components shown in FIG. 8, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory.

In FIG. 8, the processor 801 may be configured to process computer instructions and data. The processor 801 may be configured as any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. For example, the processor 801 may include two computer processors. In one definition, data is information in a form suitable for use by a computer. It is important to note that a person having ordinary skill in the art will recognize that the subject matter of this disclosure may be implemented using various operating systems or combinations of operating systems.

In the current embodiment, the input/output interface 805 may be configured to provide a communication interface to an input device, output device, or input and output device. The wireless device 800 may be configured to use an output device via the input/output interface 805. A person of ordinary skill will recognize that an output device may use the same type of interface port as an input device. For example, a USB port may be used to provide input to and output from the wireless device 800. The output device may be a speaker, a sound card, a video card, a display, a monitor, a printer, an actuator, an emitter, a smartcard, another output device, or any combination thereof. The wireless device 800 may be configured to use an input device via the input/output interface 805 to allow a user to capture information into the wireless device 800. The input device may include a mouse, a trackball, a directional pad, a trackpad, a presence-sensitive input device, a display such as a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with the display to form a presence-sensitive display. Further, the presence-sensitive input device may be coupled to the processor. The sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, the RF interface 809 may be configured to provide a communication interface to RF components such as a transmitter, a receiver, and an antenna. The network connection interface 811 may be configured to provide a communication interface to a network 843a. The network 843a may encompass wired and wireless communication networks such as a local-area network (LAN), a wide-area network (WAN), a computer network, a wireless network, a telecommunications network, another like network or any combination thereof. For example, the network 843a may be a W-Fi network. The network connection interface 811 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 811 may implement receiver and transmitter functionality appropriate to the communication network links (e.g., optical, electrical, and the like). The transmitter and receiver functions may share circuit components, software or firmware, or alternatively may be implemented separately.

In this embodiment, the RAM 817 may be configured to interface via the bus 802 to the processor 801 to provide storage or caching of data or computer instructions during the execution of software programs such as the operating system, application programs, and device drivers. In one example, the wireless device 800 may include at least one hundred and twenty-eight megabytes (128 Mbytes) of RAM. The ROM 819 may be configured to provide computer instructions or data to the processor 801. For example, the ROM 819 may be configured to be invariant low-level system code or data for basic system functions such as basic input and output (I/O), startup, or reception of keystrokes from a keyboard that are stored in a non-volatile memory. The storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 821 may be configured to include an operating system 823, an application program 825 such as a web browser application, a widget or gadget engine or another application, and a data file 827.

In FIG. 8, the processor 801 may be configured to communicate with a network 843b using the communication subsystem 831. The network 843a and the network 843b may be the same network or networks or different network or networks. The communication subsystem 831 may be configured to include one or more transceivers used to communicate with the network 843b. For example, the communication subsystem 831 may be configured to include one or more transceivers used to communicate with one or more remote transceivers of another wireless device such as a base station of a radio access network (RAN) according to one or more communication protocols known in the art or that may be developed, such as IEEE802.xx, CDMA, WCDMA, GSM, LTE, 5G NR, UTRAN, WiMax, or the like.

In another example, the communication subsystem 831 may be configured to include one or more transceivers used to communicate with one or more remote transceivers of another wireless device such as user equipment according to one or more communication protocols known in the art or that may be developed, such as IEEE802.xx, CDMA, WCDMA, GSM, LTE, 5G NR, UTRAN, WiMax, or the like. Each transceiver may include a transmitter 833 or a receiver 835 to implement transmitter or receiver functionality, respectively, appropriate to the RAN links (e.g., frequency allocations and the like). Further, the transmitter 833 and the receiver 835 of each transceiver may share circuit components, software or firmware, or alternatively may be implemented separately.

In the current embodiment, the communication functions of the communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 831 may include cellular communication, Wi-Fi communication, Bluetooth communication, and GPS communication. The network 843*b* may encompass wired and wireless communication networks such as a local-area network (LAN), a wide-area network (WAN), a computer network, a wireless network, a telecommunications network, another like network or any combination thereof. For example, the network 843*b* may be a cellular network, a Wi-Fi network, and a near-field network. The power source 813 may be configured to provide an alternating current (AC) or direct current (DC) power to components of the wireless device 800.

In FIG. 8, the storage medium 821 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 821 may allow the wireless device 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a computer-readable medium.

The functionality of the methods described herein may be implemented in one of the components of the wireless device 800 or partitioned across multiple components of the wireless device 800. Further, the functionality of the methods described herein may be implemented in any combination of hardware, software or firmware. In one example, the communication subsystem 831 may be configured to include any of the components described herein. Further, the processor 801 may be configured to communicate with any of such components over the bus 802. In another example, any of such components may be represented by program instructions stored in memory that when executed by the processor 801 performs the corresponding functions described herein. In another example, the functionality of any of such components may be partitioned between the processor 801 and the communication subsystem 831. In another example, the non-computative-intensive functions of any of such components may be implemented in software or firmware and the computative-intensive functions may be implemented in hardware.

For purposes of illustration and explanation only, embodiments of the present disclosure may be described herein in the context of operating in or in association with a RAN that communicates over radio communication channels with wireless devices, also interchangeably referred to as mobile terminals, wireless terminals, UEs and the like, using a particular radio access technology. More specifically, embodiments may be described in the context of the development of specifications for NB-IoT, particularly as it relates to the development of specifications for NB-IoT operation in spectrum or using equipment currently used by E-UTRAN, sometimes referred to as the Evolved UMTS Terrestrial Radio Access Network and widely known as the LTE system. However, it will be appreciated that the techniques may be applied to other wireless networks, as well as to successors of the E-UTRAN such as 5G NR. Thus, references herein to signals using terminology from the 3GPP standards for LTE should be understood to apply more generally to signals having similar characteristics or purposes, in other networks. For example, a physical resource block (PRB) herein comprises any physical or virtual transmission resource or group of such transmission resources; that is, a physical resource block as used herein is not limited to a physical resource block as defined in 3GPP standards.

A wireless device, as described herein, may be any type of wireless device capable of communicating with a network node or another wireless device (such as a user equipment, UE) over radio signals. In the context of the present disclosure, it should be understood that a wireless device may refer to a machine-to-machine (M2M) device, a machine-type communications (MTC) device, or an NB-IoT device. The wireless device may also be a UE, however it should be noted that the UE does not necessarily have a "user" in the sense of an individual person owning or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion that follows, the terms machine-to-machine (M2M) device, machine-type communication (MTC) device, wireless sensor, and sensor may also be used. It should be understood that these devices may be UEs, but are generally configured to transmit or receive data without direct human interaction.

In an IOT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless device as described herein may be comprised in a vehicle and may perform monitoring or reporting of the vehicle's operational status or other functions associated with the vehicle.

In one exemplary embodiment, a method may be performed by a wireless device for transmitting a signal in a first communication system that is frequency-domain multiplexed with a second communication system. The method may include generating, by a modulator of the wireless device, a modulated signal that represents one or more information symbols. The modulated signal may include one or more modulation symbols of the first communication system. Further, each modulation symbol of the first communication system may include at least one of: a period that corresponds to a symbol rate of the second communication system, a duration that is equal to or less than one modulation symbol of the second communication system, and a starting time such that the modulation symbol starts in a cyclic prefix interval of modulation symbols of the second communication system. The method may also include filtering, by a pulse shaping filter of the wireless device, the modulated signal to obtain the filtered modulated signal. The pulse shaping filter may be configured to operate with a period that corresponds to the symbol rate of the second communication system. Further, the pulse shaping filter may have a frequency response that reduces a magnitude of the modulated signal at a frequency that corresponds to a frequency of at least one carrier or sub-carrier of a signal transmitted in the second communication system. In addition, the method may include transmitting, by a transmitter of the wireless device, the filtered modulated signal at a carrier or sub-carrier frequency of the first communication system that is different from a carrier or sub-carrier frequency of the second communication system.

In another exemplary embodiment, the first communication system may use single-carrier, linear modulation and the second communication system may use orthogonal frequency division multiplexing (OFDM).

In another exemplary embodiment, each modulation symbol of the first communication system may include an alignment in time that corresponds to a modulation symbol of the second communication system.

In another exemplary embodiment, the method may include determining a carrier frequency of the filtered modulated signal. Further, the method may include transmitting the filtered modulated signal at the carrier frequency.

In another exemplary embodiment, the method may include adjusting the carrier frequency to compensate for a decay in magnitude in a guard band of the second communication system. Further, the carrier frequency may be in the guard band of the second communication system.

In another exemplary embodiment, the method may include determining the carrier frequency based on a data bandwidth requirement of the wireless device.

In another exemplary embodiment, the carrier frequency may be in a guard band of the second communication system.

In another exemplary embodiment, the carrier frequency may be near an edge of a frequency band of the second communication system.

In another exemplary embodiment, the carrier frequency may be about an arithmetic mean between two adjacent sub-carriers of the second communication system.

In another exemplary embodiment, the pulse shaping filter may have a frequency response that includes a null that corresponds to a frequency of at least one carrier or sub-carrier of a signal transmitted in the second communication system.

In another exemplary embodiment, the pulse shaping filter may be a finite impulse response (FIR) filter that includes a zero on or near the unit circle of a pole-zero diagram at a frequency that corresponds to a frequency of at least one carrier or sub-carrier of a signal transmitted in the second communication system.

In another exemplary embodiment, the modulated signal may have a constant envelope.

In another exemplary embodiment, a bandwidth of the first communication system may be less than a bandwidth of the second communication system.

In another exemplary embodiment, the modulated signal may be a narrowband Internet of Things (NB-IoT) signal.

In another exemplary embodiment, the first communication system may be a narrowband Internet of Things (NB-IoT) system and the second communication system may be a wideband orthogonal frequency division multiplexing (OFDM) system.

In one exemplary embodiment, a wireless device may transmit a signal in a first communication system that is frequency-domain multiplexed with a second communication system. The wireless device may be configured to include a modulator, a pulse shaping filter, and a transmitter. The modulator may be configured to generate a modulated signal that represents one or more information symbols. The modulated signal may include one or more modulation symbols of the first communication system. Each modulation symbol of the first communication system may include at least one of: a period that corresponds to a symbol rate of the second communication system, a duration that is equal to or less than one modulation symbol of the second communication system, and a starting time such that the modulation symbol starts in a cyclic prefix interval of modulation symbols of the second communication system. The pulse shaping filter may be operationally coupled to the modulator and may be configured to filter the modulated signal to obtain the filtered modulated signal. Further, The pulse shaping filter may be configured to operate with a period that corresponds to the symbol rate of the second communication system and may have a frequency response that reduces a magnitude of the modulated signal at a frequency that corresponds to a frequency of at least one carrier or sub-carrier of a signal transmitted in the second communication system. The transmitter may be operationally coupled to the pulse shaping filter and may be configured to transmit the filtered modulated signal at a carrier or sub-carrier frequency of the first communication system that is different from a carrier or sub-carrier frequency of the second communication system.

In one exemplary embodiment, a wireless device may transmit a signal in a first communication system that is frequency-domain multiplexed with a second communication system. The wireless device may include means for generating a modulated signal that represents one or more information symbols. Further, the modulated signal may include one or more modulation symbols of the first communication system. Each modulation symbol of the first communication system may include at least one of: a period that corresponds to a symbol rate of the second communication system, a duration that is equal to or less than one modulation symbol of the second communication system, and a starting time such that the modulation symbol starts in a cyclic prefix interval of modulation symbols of the second communication system. The wireless device may also include means for filtering the modulated signal to obtain the filtered modulated signal. The means for filtering may be configured to operate with a period that corresponds to the symbol rate of the second communication system and may have a frequency response that reduces a magnitude of the modulated signal at a frequency that corresponds to a frequency of at least one carrier or sub-carrier of a signal transmitted in the second communication system. In addition, the wireless device may include means for transmitting the filtered modulated signal at a carrier or sub-carrier frequency of the first communication system that is different from a carrier or sub-carrier frequency of the second communication system.

In one exemplary embodiment, a method may be performed by a wireless device for receiving a signal in a first communication system that is frequency-domain multiplexed with a second communication system. The method may include receiving, by a receiver of the wireless device, at a carrier or sub-carrier frequency of the first communication system that is different from a carrier or sub-carrier frequency of the second communication system, a modulated signal that represents one or more information symbols. The modulated signal may include one or more modulation symbols of the first communication system. Each modulation symbol of the first communication system may include at least one of: a period that corresponds to a symbol rate of the second communication system, a duration that is equal to or less than one modulation symbol of the second communication system, and a starting time such that the modulation symbol starts in a cyclic prefix interval of modulation symbols of the second communication system. In addition, the method may include demodulating, by a demodulator of the wireless device, the modulated signal to obtain information symbols.

In another exemplary embodiment, each modulation symbol of the first communication system may include an alignment in time that corresponds to a modulation symbol of the second communication system.

In another exemplary embodiment, the method may include receiving a combined signal that includes the modulated signal of the first communication system and a modulated signal of the second communication system. Further, the method may include performing a single discrete Fourier transform (DFT) on the combined signal to obtain the information symbols associated with the modulated signal of the first communication system and information symbols associated with the modulated signal of the second communication system.

In another exemplary embodiment, the method may include using a single DFT circuit, wherein a single DFT circuit is used to demodulate at least one of the modulated signal of the first communication system and a modulated signal of the second communication system.

In one exemplary embodiment, a wireless device may receive a signal in a first communication system that is frequency-domain multiplexed with a second communication system. Further, the wireless device may be configured to include a receiver and a demodulator. The receiver may be configured to receive, at a carrier or sub-carrier frequency of the first communication system that is different from a carrier or sub-carrier frequency of the second communication system, a modulated signal that represents one or more information symbols. The modulated signal may include one or more modulation symbols of the first communication system. Further, each modulation symbol of the first communication system may include at least one of: a period that corresponds to a symbol rate of the second communication system, a duration that is equal to or less than one modulation symbol of the second communication system, and a starting time such that the modulation symbol starts in a cyclic prefix interval of modulation symbols of the second communication system. The demodulator may be operationally coupled to the receiver and may be configured to demodulate the modulated signal to obtain information symbols.

In one exemplary embodiment, a wireless device may receive a signal in a first communication system that is frequency-domain multiplexed with a second communication system. The wireless device may include means for receiving, at a carrier or sub-carrier frequency of the first communication system that is different from a carrier or sub-carrier frequency of the second communication system, a modulated signal that represents one or more information symbols. The modulated signal may include one or more modulation symbols of the first communication system. Each modulation symbol of the first communication system may include at least one of: a period that corresponds to a symbol rate of the second communication system, a duration that is equal to or less than one modulation symbol of the second communication system, and a starting time such that the modulation symbol starts in a cyclic prefix interval of modulation symbols of the second communication system.

In addition, the wireless device may include means for demodulating the modulated signal to obtain information symbols.

Addendum:

Overview:

This Addendum describes systems and methods to create memoryless linearly modulated, single carrier signals that are orthogonal to OFDM signals or the like. Further, this addendum describes that any linearly modulated signal that is orthogonal to an OFDM signal may be generated by the disclosed systems and methods. This addendum also describes the design of single carrier, linearly modulated signals that are approximately orthogonal to OFDM signals or the like, but which have desirable properties such as short pulse shaping filters (the length of the filter is measured in time units such as microseconds), steep spectral decay, or the like.

This Addendum describes allowing frequency domain multiplexing of any mix of IoT and broadband devices, while fulfilling simultaneously or contemporaneously one or more of the following conditions:
  full use of the available bandwidth (no guard bands or null sub-carriers are needed);
  energy efficiency or coverage extension is achieved by means of power efficient, constant or near-constant envelope modulations (this is beneficial for IoT transmitters and is realized by means of single sub-carrier modulation);
  flexible choice of data rates for all users, including IoT devices constrained to use a single sub-carrier;
  single-FFT OFDMA receiver architecture is re-used (one FFT over the whole band is enough to separate the multiple users and yields sufficient statistics for the user data; further, this is a useful property if low complexity multi-user receivers are required/desired); or
  flexible design of single-carrier waveforms in order to fulfill data rate, passband, stop band, spectrum decay, other desired characteristics, or any combination thereof.

Furthermore, this Addendum describes an OFDMA system where some users are allowed to use single carrier, linearly modulated signals sharing the same frequency band as OFDM users, under the constraint of being orthogonal (or near-orthogonal) in the frequency domain with respect to the other users in the system. In addition, orthogonality may be ensured by one or more of the following conditions:
  extending periodically the pulse shaping filter to a periodic function of time with period equal to the OFDM symbol duration and guaranteeing that Fourier series coefficients of the periodically extended pulse shaping filter corresponding to the tones used by the other users in the OFDMA system are zero, or alternatively small in magnitude, in which case near-orthogonality is obtained;
  introducing periodicity in the single carrier, linearly modulated signals so that these signals are periodic over time intervals of the length of the OFDM symbols; or
  aligning in time the OFDM signals, so that any segments of the OFDM signals and of the single carrier signals with a duration equal to the OFDM symbol length appears periodic in time if the starting time is chosen to lie within the cyclic prefix of an OFDM symbol.

The Fourier series coefficients of the periodically extended, pulse shaping filter, which do not correspond to tones equal to the subcarrier frequencies employed by other users, may be selected to satisfy bandwidth requirements, spectrum requirements, the like, or any combination thereof.

The center frequency of the single-carrier signals may be selected according to the application, bandwidth occupancy and may not need to coincide with the OFDM subchannel raster. In other words, the center frequency of the single-carrier signals may not need to be equal to the center frequency of some subcarrier.

The receiver of the multiple users may employ one DFT to separate in the frequency domain all the users, including the single carrier users.

Single-carrier, linearly modulated signals assigned a center frequency at the band edge or guard band of the OFDMA system may have asymmetric spectra, satisfying frequency domain orthogonality (or near-orthogonality) conditions with respect the other users on one side of its center of frequency and spectrum mask constraints on the other side of its center of frequency Moreover, this addendum describes facilitating the coexistence of multiple users in an OFDMA system where one or more of the users utilize a single carrier modulation, while others utilize OFDM. For instance, two or more users may be multiplexed in the frequency domain, but not all of them may employ OFDM modulation.

OFDMA System Parameters:
The OFDMA system parameters may include:
OFDMA system bandwidth: w [Hz];
number of subcarriers: N;
OFDM symbol length: $T_{OFDM}=N/W$ [s];
subcarrier spacing:

$$\Delta f = \frac{W}{N} = 1/T_{OFDM} [Hz];$$

OFDM cyclic prefix duration: $T_{CP}$;
subcarriers used by OFDM signals in OFDMA system:
$0 \leq k_0 < k_1 < \ldots < k_{M-1} \leq N-1$; or
sequence of frequency domain complex constellation symbols, for the OFDM symbol (e.g. BPSK or QAM): $(b_{k_m})_{m=0}^{M-1}$.

With this notation, a transmitted (baseband) OFDM symbol may be represented in the form:

$$1y(t) = \sum_m b_{k_m} e^{j2\pi k_m \Delta f t} = \sum_m b_{k_m} e^{j\frac{2\pi k_m t}{T_{OFDM}}}, \quad \text{Equation (1)}$$

$$0 \leq t \leq T_{OFDM}$$

Moreover, due to cyclic prefix insertion, the signal may be periodically extended, with period $T_{OFDM}$ to the time interval $t \in [-T_{CP}, T_{OFDM}]$. In other words, if $-T_{CP} \leq t \leq 0$, then $y(t)=y(t+T_{OFDM})$. Further, subcarrier number k, refers to the tone $$e^{j\frac{2\pi kt}{T_{OFDM}}}.$$

The system parameters, such as the number of subcarriers or cyclic prefix duration, may be design parameters. Their choice may be influenced by the deployment characteristics of the system (e.g., maximum expected delay spread in the propagation radio channel, expected mobility of the users), and by other factors such as receiver complexity (e.g., FFT size).

The subcarrier numbers $(k_m)_{m=0}^{M-1}$ may not be required to be contiguous.

OFDMA systems like LTE or 802.1 lax are packet based. One packet usually contains several consecutive OFDM symbols. This Addendum provides for the use of such packets. However, it may be sufficient to consider one OFDM symbol in order to describe the details of this Addendum.

Single Carrier User Parameters:
For a single carrier user, one or more of the following parameters may apply:
Pulse shaping filter: p(•);
Symbol period for single-carrier user: τ [s]; or
Sequence of complex constellation symbols (e.g., BPSK or QAM): ($a_k$).

Just as for the OFDMA system, these parameters, such as the pulse bandwidth or the symbol period, may be design parameters. Their choice may be influenced by the deployment characteristics of the system (e.g., maximum expected delay spread in the propagation radio channel, expected mobility of the users, or the like), by other factors such as receiver cost and complexity, or the like.

No assumptions may be made on the center frequency of the pulse shaping filter, p(•). Also, complex-valued pulse shaping filters may be used. This level of generality may be useful because the center frequency of the single carrier, linearly modulated signal, x(t), may be chosen to lie anywhere, inside or outside, of the frequency band of operation of the OFDMA system. This may be convenient in some deployment scenarios, for example, when the single carrier user is allocated a frequency sub-band inside but at the edge of the band of operation of the OFDMA system. In this scenario, it may be convenient to frequency shift the single carrier system by an amount that depends, for instance, on the decay of its spectrum.

The baseband signal for a linearly modulated, single carrier user, may be expressed in the form:

$$x(t) = \sum_k a_k p(t-k\tau).$$

Since the subcarriers may not be contiguous, the baseband signal may not have a spectrum centered around the zero frequency. A complex valued filter generally requires an increase in the computational complexity of the transmitter.

Periodic Extension of the Pulse Shaping Filter:
Next, an auxiliary pulse shaping filter may be introduced. Define $\bar{p}(t)$, the periodic extension with period $T_{OFDM}$ of the pulse shaping filter p(t), as follows:

$$\bar{p}(t) := \sum_{k=-\infty}^{\infty} p(t-kT_{OFDM}).$$

Figure 12:
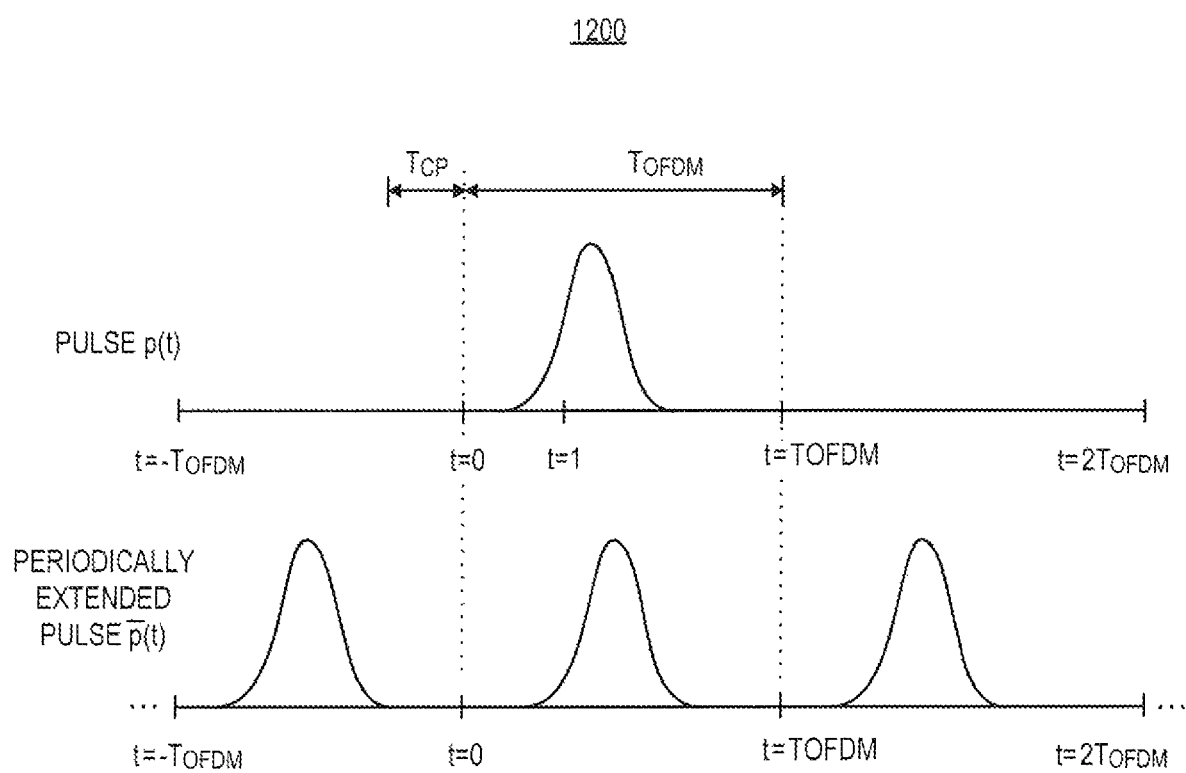
FIG. 12 illustrates one embodiment of a period of a pulse shaping filter in accordance with various aspects as described herein.

It is well known that a periodic function may be expanded in a Fourier series. The pulse $\bar{p}$ is exemplified in FIG. 12.

$$\text{If } \hat{p}_m := \frac{1}{T} \int_0^T p(t) e^{-j2\pi mt/T_{OFDM}} dt, \text{ then:} \quad \text{Equation (2)}$$

-continued $$2p(t) = \sum_{m=-\infty}^{\infty} \hat{p}_m e^{-j2\pi mt/T_{OFDM}}.$$

Moreover, it also known that for any real u:

$$\bar{p}(t-u) = \sum_{m=-\infty}^{\infty} \hat{c}_m e^{-j\pi mu/T_{OFDM}} e^{-j2\pi mt/T_{OFDM}}. \quad \text{Equation (3)}$$

Necessary and Sufficient Conditions for the Orthogonality Among Single Carrier and Multicarrier OFDM Signals:

Necessary and sufficient conditions for the single carrier signal x(t) to be orthogonal in the frequency domain to the OFDM signal y(t) over the time interval $0 \leq t \leq T_{OFDM}$ are now examined. These conditions may be extended to an OFDM signal consisting of several symbols. These conditions may include one or more of the following:

(1) the single carrier, linearly modulated signal x(t) is periodic with period $T_{OFDM}$ over the time interval $t \in [-T_{CP}, T_{OFDM}]$ (in other words, if $-T_{CP} \leq t \leq 0$, then $x(t) = x(t+T_{OFDM})$; or Condition (1)

(2) the Fourier coefficients of the periodically extended pulse $\bar{p}$ satisfy $\hat{p}_{k_m} = 0$, $m = 0, \ldots, M-1$. Condition (2)

Condition (1) may be equivalent to the following condition:

(1bis) the single carrier, linearly modulated signal $x(t) = \Sigma_k a_k \bar{p}(t-k\tau)$, for $-T_{CP} \leq t \leq T_{OFDM}$ (notice the use of the periodically extended pulse $\bar{p}$).

These conditions may yield orthogonality. If the single carrier signal x(t) is transmitted, then the noiseless, continuous time received signal r(t) may be expressed in the form r(t)=h*x(t), where h(t) models the propagation channel, including the RF channel and any transmit and receive filtering. It may be assumed that the total delay spread does not exceed the length of the cyclic prefix. That is, h(t)=0 if t<0 or $t > T_{CP}$.

The subcarriers numbered $k_m$, $0 \leq m \leq M-1$ may be allocated to users other than the specific single carrier user whose transmitted signal is x(t), and that this single carrier signal x(t) may not interfere with those other users.

The processing for the subcarrier number $k_m$ in an OFDM receiver may proceed as follows:

$$R(k_m \Delta f) = \int_0^{T_{OFDM}} r(t) e^{-j2\pi k_m \Delta f t} dt. \quad \text{Equation (4)}$$

Expanding r(t) may provide as follows:

$$R(k_m \Delta f) = \int_0^{T_{OFDM}} h*x(t) e^{-j2\pi k_m \Delta f t} dt = \int_0^{T_{OFDM}} \int_0^{T_{CP}} h(s) x(t-s) ds e^{-j2\pi k_m \Delta f t} dt.$$

Using the definition of x(t) and Condition (1) above may provide the following:

$$R(k_m \Delta f) = \int_0^{T_{OFDM}} \int_0^{T_{CP}} h(s) \sum_k a_k p(t-k\tau-s) ds \, e^{-j2\pi k_m \Delta f t} dt.$$

Developing the periodic function $\bar{p}$ in a Fourier series according to Equation (3) may provide as follows:

$$R(k_m \Delta f) = \int_0^{T_{OFDM}} \int_0^{T_{CP}} h(s) \sum_k a_k \sum_{n=-\infty}^{\infty} \hat{p}_n e^{j2\pi n(k\tau+s)/T_{OFDM}} e^{-j2\pi nt/T_{OFDM}} ds \, e^{-j2\pi k_m t/T_{OFDM}} dt.$$

Interchanging the order of integration and summation may provide as follows:

$$R(k_m \Delta f) = \int_0^{T_{CP}} h(s) \sum_k a_k \sum_{n=-\infty}^{\infty} \hat{p}_n e^{j2\pi n(k\tau+s)/T_{OFDM}}$$

$$\int_0^{T_{OFDM}} e^{-j2\pi nt/T_{OFDM}} e^{-j2\pi k_m t/T_{OFDM}} dt ds.$$

Since the complex exponentials are orthogonal, i.e.

$$\int_0^{T_{OFDM}} e^{-\frac{j2\pi nt}{T_{OFDM}}} e^{-\frac{j2\pi mt}{T_{OFDM}}} dt = T_{OFDM} \delta(m-n),$$

where $\delta(\bullet)$, denotes the delta function, the following may be provided:

$$R(k_m \Delta f) = T_{OFDM} \hat{p}_{k_m} \int_0^{T_{CP}} h(s) \Sigma_k a_k e^{j2\pi n(k\tau+s)/T_{OFDM}} ds. \quad \text{Equation (5)}$$

Condition (2) above may ensure that $\hat{p}_{k_m} = 0$. Therefore:

$$R(k_m \Delta f) = 0. \quad \text{Equation (6)}$$

Equation (6), together with the principle of superposition, may imply that the linearly modulated, single carrier signal x(t) is orthogonal to any OFDM signal in the OFDMA system that uses only subcarriers numbered $k_m$, $m=0, \ldots, M-1$. This shows that Conditions (1) and (2) above may be sufficient, if not necessary, to ensure orthogonality. Indeed, if Conditions (1) and (2) are not fulfilled then it follows from Equation (5) that orthogonality may not be ensured.

In many practical applications, it is not necessary to require the Fourier coefficients to be equal to zero. The equality may be relaxed to inequality such as follows:

$$|\hat{p}_{k_m}| \leq \epsilon_m, \, m=0, \ldots, M-1, \quad \text{Equation (7)}$$

where $\epsilon_m$, $m=0, \ldots, M-1$ are (small) positive numbers. The condition of Equation (7) may be referred to as approximate orthogonality.

Figure 13:
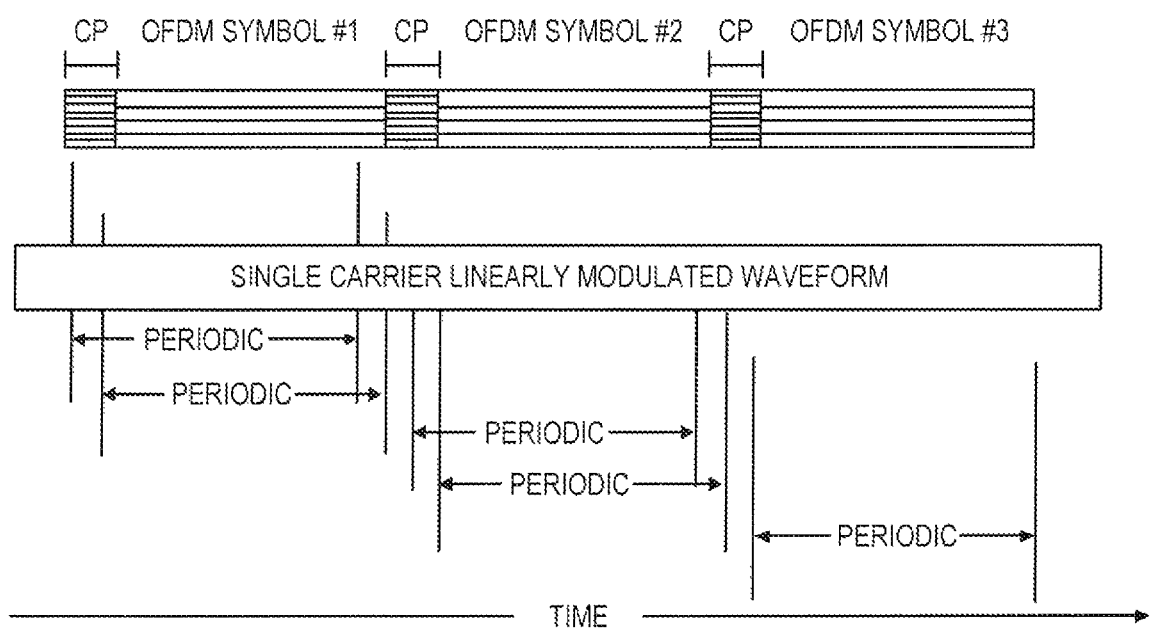
FIG. 13 illustrates one embodiment of modulation symbols in a first communication system and a second communication system in accordance with various aspects as described herein.

Extension to Arbitrary Number of OFDM Symbols:

Wireless OFDMA systems like LTE and 802.11ax are packet based. A packet consists of several consecutive OFDM symbols. This Addendum also applies to packet-based OFDMA systems. The total duration of one OFDM symbol, including the cyclic prefix, is $T_{total} = (T_{OFDM} + T_{CP})$, so Condition (1) may become:

(1c) The single carrier, linearly modulated signal x(t) is periodic with period $T_{OFDM}$ over the time interval $t \in [-T_{CP}+mT_{total}, T_{OFDM}+mT_{total}]$, for all integers m (positive or negative) for which there is an OFDM symbol in said time interval, as illustrated in FIG. 13.

Construction of Pulse Shaping Filters:

In this section, systems and methods are provided to construct pulse shaping filters that yield single carrier, linearly modulated orthogonal to a given set of OFDM signals.

In one embodiment, a pulse shaping filter p(t) is provided. First, the Fourier series coefficients $(\hat{p}_m)$ of its periodic extension $\bar{p}(t)$ (with period $T_{OFDM}$) may be determined. Then, a new Fourier series may be derived by damping or nulling some of the coefficients, in order to obtain orthogonality or near orthogonality, as described by Equation (7).

$$\hat{q}_n = \begin{cases} \hat{p}_n, & \text{if } n \notin \{k_0, k_1, \ldots, k_{M-1}\} \\ \varepsilon_n \hat{p}_n & \text{if } n \in \{k_0, k_1, \ldots, k_{M-1}\} \end{cases} \quad \text{Equation (8)}$$

The quantity $\varepsilon_n$ may be used to control the amount of leakage into the subcarrier number $k_n$. For example, if $\varepsilon_n=0$ then no leakage may occur. However, the Fourier coefficients may be dampened without making them zero. For instance, the quantity $\varepsilon_n$ may be defined as $0<\varepsilon_n<1$.

A pulse shaping filter $q(\cdot)$ satisfying Condition (2) above may be obtained by means of the Fourier series:

$$q(t) := \sum_{m=-\infty}^{\infty} \hat{q}_m e^{-\frac{j2\pi mt}{T_{OFDM}}}, \quad 0 \leq t \leq T_{OFDM}. \quad \text{Equation (9)}$$

Equation (8) may not be the only way to modify the Fourier coefficients in order to obtain near orthogonality. For instance, near orthogonality may be obtained by ensuring that the coefficients $\hat{q}_n$ are small enough so that the intercarrier interference becomes negligible. An alternative to Equation (8) is as follows:

$$\hat{q}_n = \begin{cases} \hat{p}_n, & \text{if } n \notin \{k_0, k_1, \ldots, k_{M-1}\} \\ \varepsilon_n \hat{p}_n & \text{if } n \in \{k_0, k_1, \ldots, k_{M-1}\} \end{cases}, \quad \text{Equation (10)}$$

where $|\rho_n|<|\hat{p}_n|$.

In another embodiment, the pulse may be initially designed as a digital filter. The basic idea is to place the zeros of the digital filter at the locations in the unit circle corresponding to the center of frequency of the subcarriers numbered $k_0, k_1, \ldots, k_{M-1}$. For instance, let $z_{k_m}:=e^{j2\pi k_m/N}$, and let $g(z)$ be an arbitrary polynomial (for the sake of completeness, one may make $g(z)\equiv 1$). Define the system function $\mathcal{P}(z^{-1})$ in the z-plane according to the following expression:

$$\mathcal{P}(z^{-1}) := g(z^{-1}) \Pi_{m=1}^{M}(z^{-1}-z_{k_m}). \quad \text{Equation (11)}$$

By construction:

$$\mathcal{P}\left(e^{-j\frac{2\pi k_m}{N}}\right) = 0.$$

Hence, $\mathcal{P}(z^{-1})$ is the Z-transform of a digital filter and may be written in the form:

$$\mathcal{P}(z^{-1}) \equiv \sum_{l=0}^{N_p-1} \rho_l z^{-l},$$

for some positive integer $N_p$. Further, a continuous pulse shaping filter may be defined. First, set:

$$p\left(l\frac{T_{OFDM}}{N}\right) = \begin{cases} \rho_l & \text{if } 0 \leq l \leq N_p - 1 \\ 0 & \text{otherwise} \end{cases}.$$

Second, $$p\left(l\frac{T_{OFDM}}{N}\right)$$

may be extended to a continuous function $p(t)$ (e.g., by interpolation) such that $p(t)=0$ if $t<0$ or $t>T_{OFDM}$. Hence, the periodic extension $\bar{p}(t)=p(t)$ for $0 \leq t \leq T_{OFDM}$ may satisfy:

$$\sum_{n=0}^{N-1} e^{-\frac{j2\pi k_m n}{N}} p(n) = \sum_{l=0}^{N_p-1} \rho_l e^{\frac{j2\pi k_m l}{N}} = \mathcal{P}\left(e^{-j\frac{2\pi k_m}{N}}\right) = 0.$$

The polynomial $g(z)$ may afford extra degrees of freedom in the design of the pulse shaping filter. Further, $g(z)$ may be used such as to shape the passband.

Near-orthogonality may be achieved by choosing the locations of the zeros of $\mathcal{P}(z^{-1})$ close to but not exactly equal to the frequencies $z_{k_m}$. For instance, a set of (small) complex coefficients $\varepsilon_m$, $m=0, \ldots M-1$, may be chosen and:

$$\mathcal{P}(z^{-1}) := g(z^{-1}) \Pi_{m=1}^{M}(z^{-1}-z_{k_m}-\vartheta_m). \quad \text{Equation (12)}$$

Equation (12) is a slight modification of Equation (11), where the zeros have been perturbed. The objective is to allow more degrees of freedom for the waveform in order to obtain better characteristics in time of frequency (e.g., flatter passband, increase of the stopband attenuation, or the like) at the cost of not having ideal orthogonality. This is usually not a problem since in practice transmitter or receiver imperfections (e.g., time or frequency errors) may prevent ideal orthogonality, and therefore near orthogonality is typically good enough.

Design Criteria for the Pulse Shaping Filter:

It is apparent from Equations (8), (10), (11) and (12) that orthogonality (or near orthogonality) may impose constraints on some of the Fourier series coefficients of $\bar{p}$ (alternatively, on some of the zeros of the transfer function $\mathcal{P}$). The other Fourier series coefficients may be chosen freely in order to obtain any required signal bandwidth, PAPR, spectrum characteristics or the like, and may allow the optimization of the waveform characteristics for specific deployment scenarios. In addition, the symbol period and center frequency may also be chosen to fit the requirements of specific deployment scenarios.

Periodicity of the Single Carrier Waveform:

The symbol period $\tau$ for a single carrier waveform may be chosen arbitrarily. Also, different single carrier users may use different pulse shaping filters and different symbol rates. However, when the symbol period is chosen to be a fraction of the OFDM symbol length $T_{OFDM}$ and of the cyclic prefix $T_{CP}$, that is, when there are positive integer q and l such that $T_{OFDM}=q\tau$ and $T_{CP}=l\tau$, the periodicity of the single carrier waveform may be provided by adding a cyclic prefix. The constellation symbols for a single carrier user may be grouped in groups of q symbols and a cyclic prefix consisting of the last l symbols may be appended.

$$[a_0, a_1, \ldots, a_{q-1}] \rightarrow [a_{q-l+1}, \ldots a_q, a_0, a_1, \ldots, a_{q-1}].$$

Figure 14:
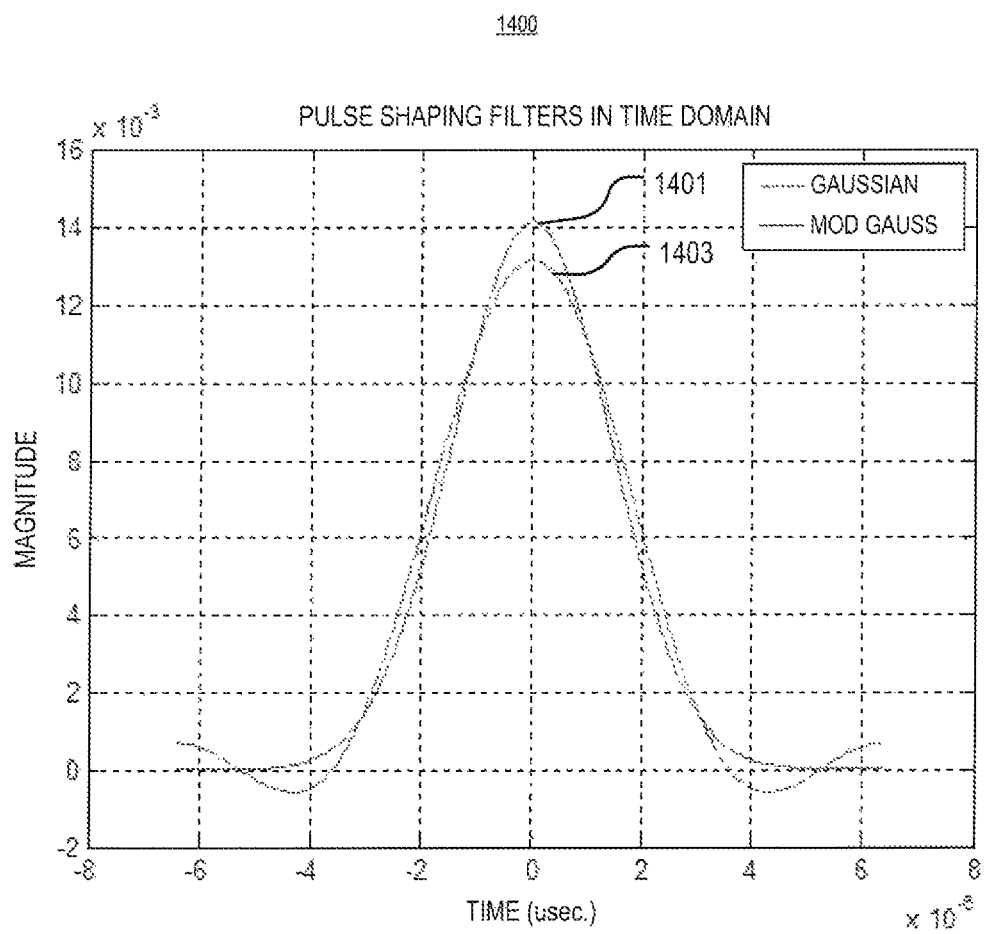
FIG. 14 provides a chart of a time response of one embodiment of a pulse shaping filter in accordance with various aspects as described herein.
Figure 15:
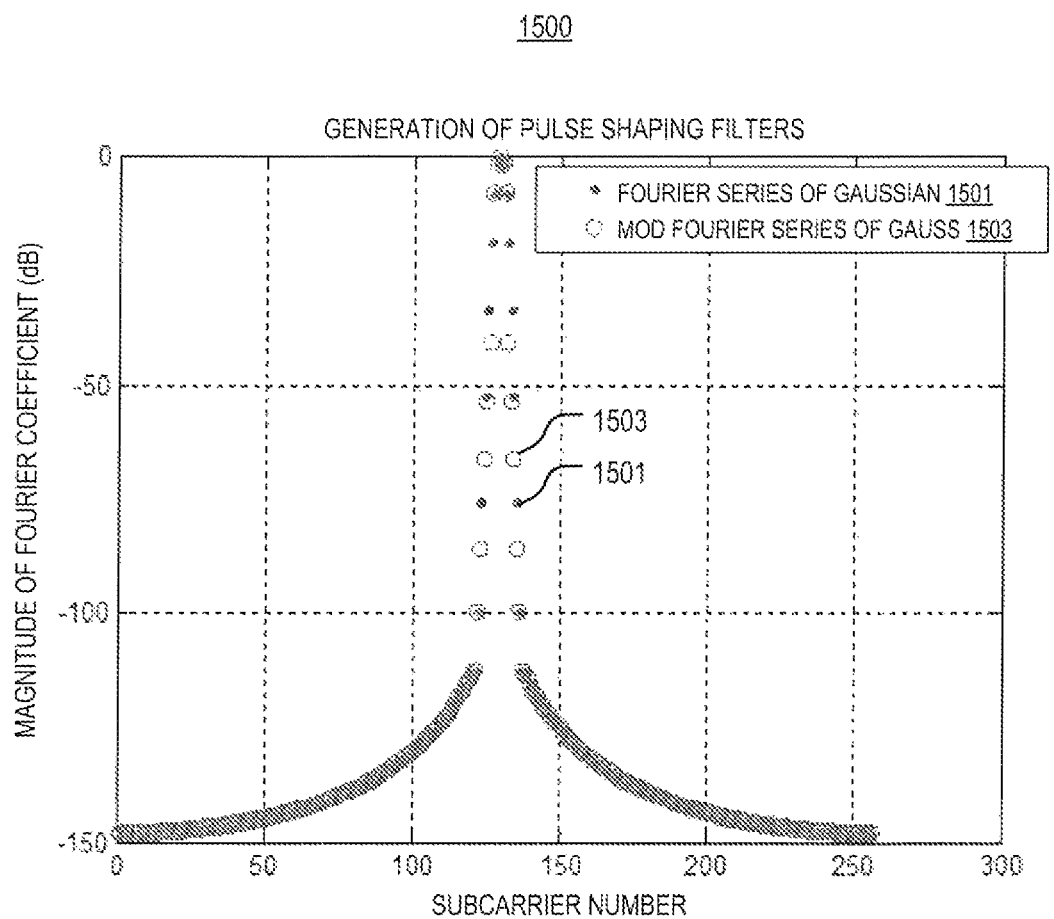
FIG. 15 provides a method of generating a pulse shaping filter in accordance with various aspects as described herein.

Waveform Design for in-Band Deployment:

In this embodiment, the OFDMA system may utilize two hundred and fifty-six (256) subcarriers. Suppose that a Gaussian pulse 1401 shown in FIG. 14 fulfills the spectrum, PAPR and other desired characteristics for a single carrier, linearly modulated waveform. However, if the Gaussian pulse 1401 is used in the middle of the OFDMA band of operation, the resulting signals may not be orthogonal to any OFDM signals sharing the band. Fourier coefficients 1501 of the Gaussian pulse 1401 are shown in FIG. 15. Further, the Fourier coefficients 1501 of the Gaussian pulse 1401 are modified using Equation (8) above to obtain modified Gaussian Fourier coefficients 1503 as shown in FIG. 15, which has near orthogonality. From these modified Gaussian Fourier coefficients 1503, a modified Gaussian pulse 1403 is obtained using Equation (9) above as shown in FIG. 14.

Figure 16:
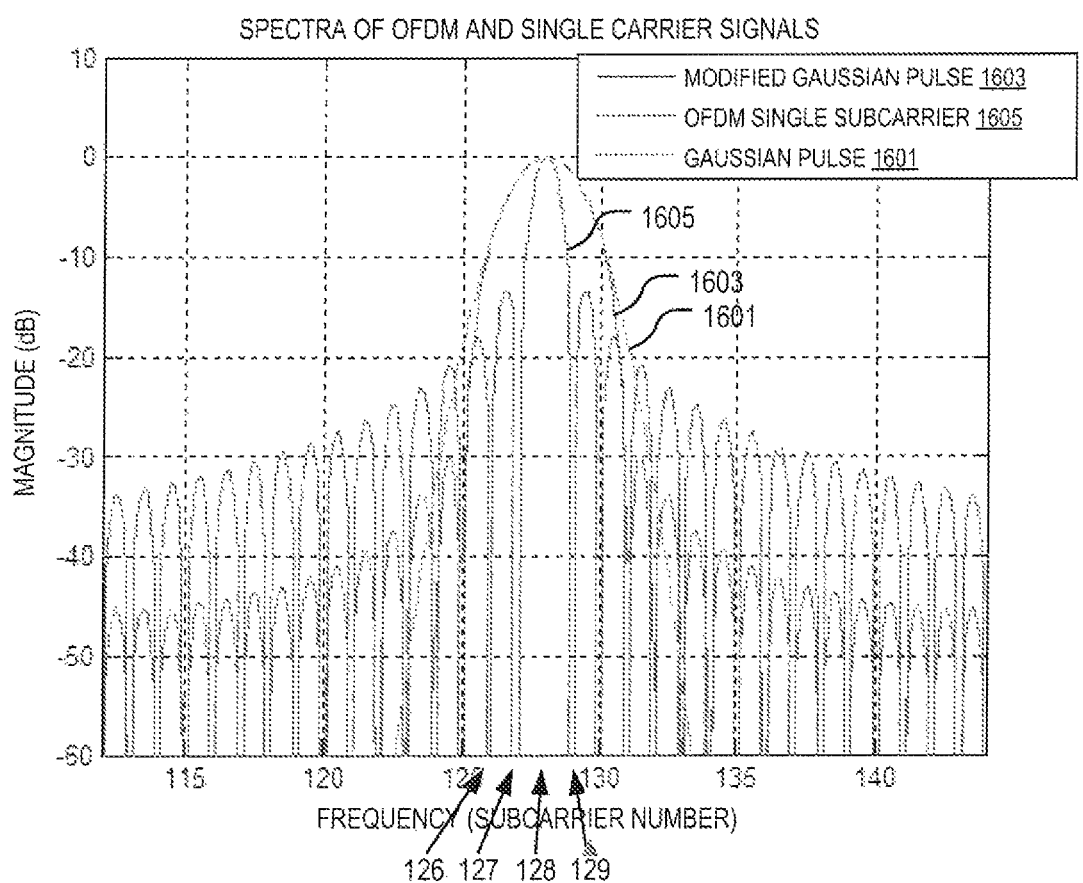
FIG. 16 provides a chart of a frequency response of a single-carrier signal using one embodiment of a pulse shaping filter in accordance with various aspects as described herein.

The spectra of a single OFDM sub-carrier 1605, the Gaussian pulse 1401 and the modified Gaussian pulse 1403 are shown in FIG. 16. The passband of the Gaussian pulse and the passband of the modified Gaussian pulse are substantially the same. Moreover, if the sub-band spanned by subcarriers corresponding to subcarrier numbers 126, 127, 128, 129 and 130 are assigned to the single carrier, linearly modulated waveform, then any other OFDM users or single carrier users in the OFDMA system allocated other subcarriers will be nearly orthogonal in the frequency domain.

Figure 17:
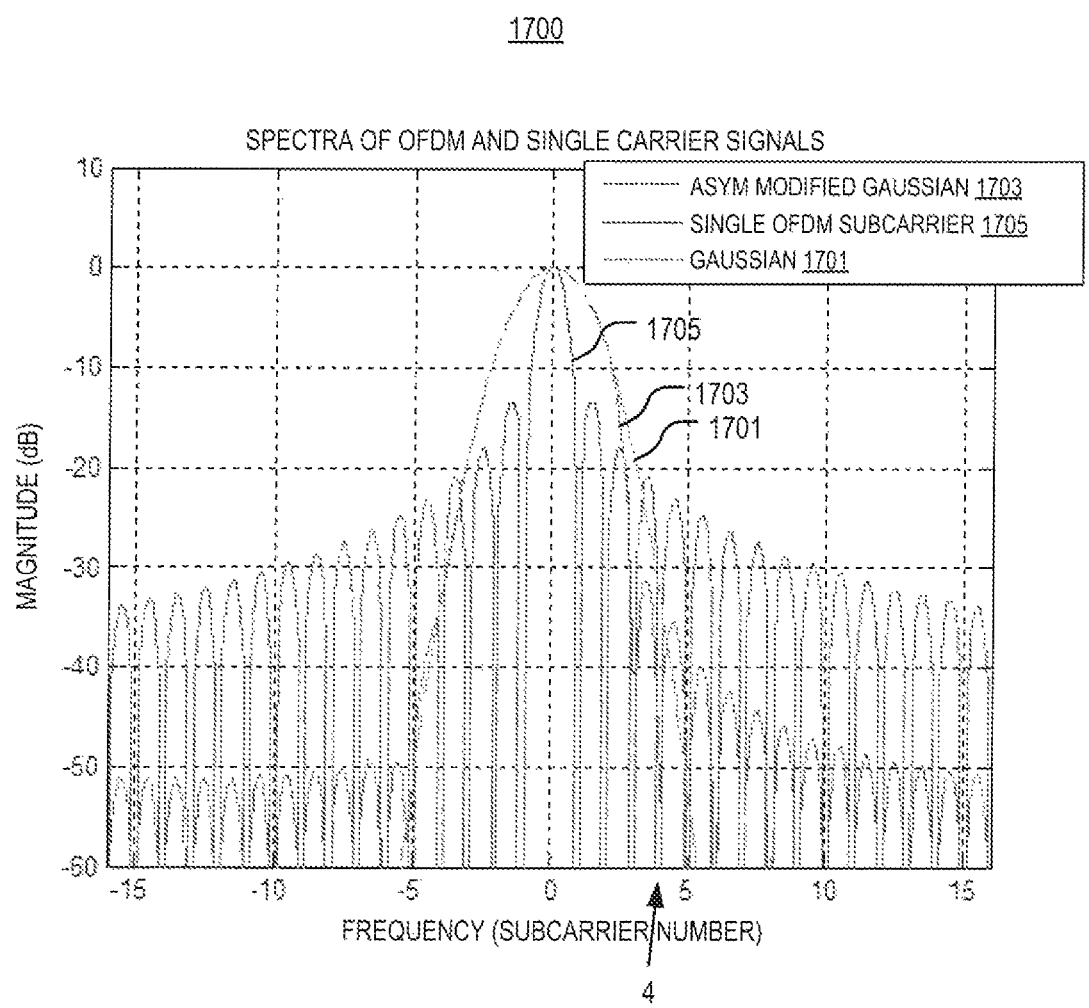
FIG. 17 provides a chart of a frequency response of a single-carrier signal using one embodiment of a pulse shaping filter in accordance with various aspects as described herein.

Waveform Design for Band-Edge or Guard Band Deployment:

In this embodiment, the OFDMA system utilizes two hundred and fifty-six (256) subcarriers. Suppose that it is desired to allocate the single carrier waveform to the guard band or band edge, labeled with subcarrier number zero (0) in FIG. 17. Since there are no OFDMA users allocated to the left of this user, there is no need to enforce orthogonality on subcarrier numbers −1, −2, −3, etc. Orthogonality in the frequency domain is desired with respect to subcarriers number four (4) or larger. On the other hand, it may be desired to fulfill more stringent spectrum mask requirements to the left (negative subcarrier numbers) than to the right (positive subcarriers numbers), since the emissions to the right may be in-band emissions, while the emissions to the left may be out of band emissions. Then asymmetric constraints may be imposed on the Fourier series coefficients. In FIG. 17, the resulting asymmetric spectrum 1703 corresponds to applying asymmetric constraints to the Modified Gaussian Fourier series coefficients 1503. FIG. 17 also shows a spectrum of the Gaussian pulse 1701 and a spectrum of a single OFDM subcarrier 1705.

Figure 18:
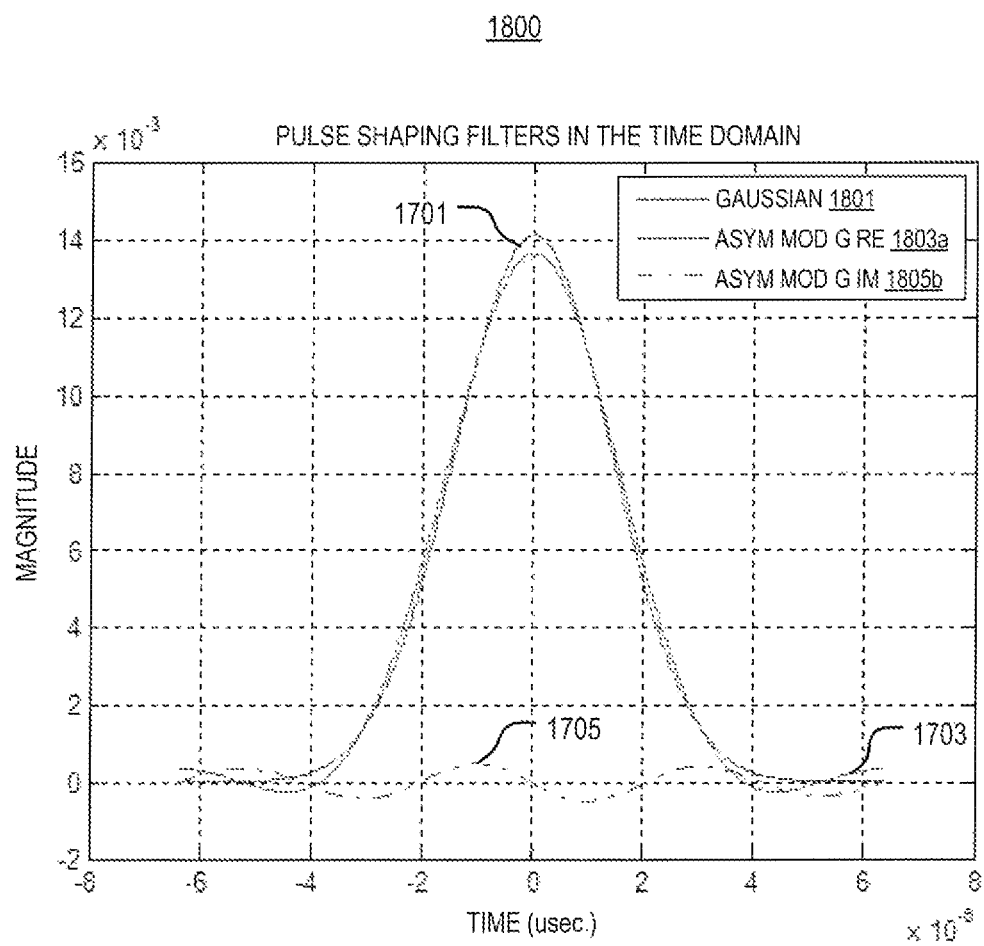
FIG. 18 provides a chart of a time response of a single-carrier signal using one embodiment of a pulse shaping filter in accordance with various aspects as described herein.
Figure 19:
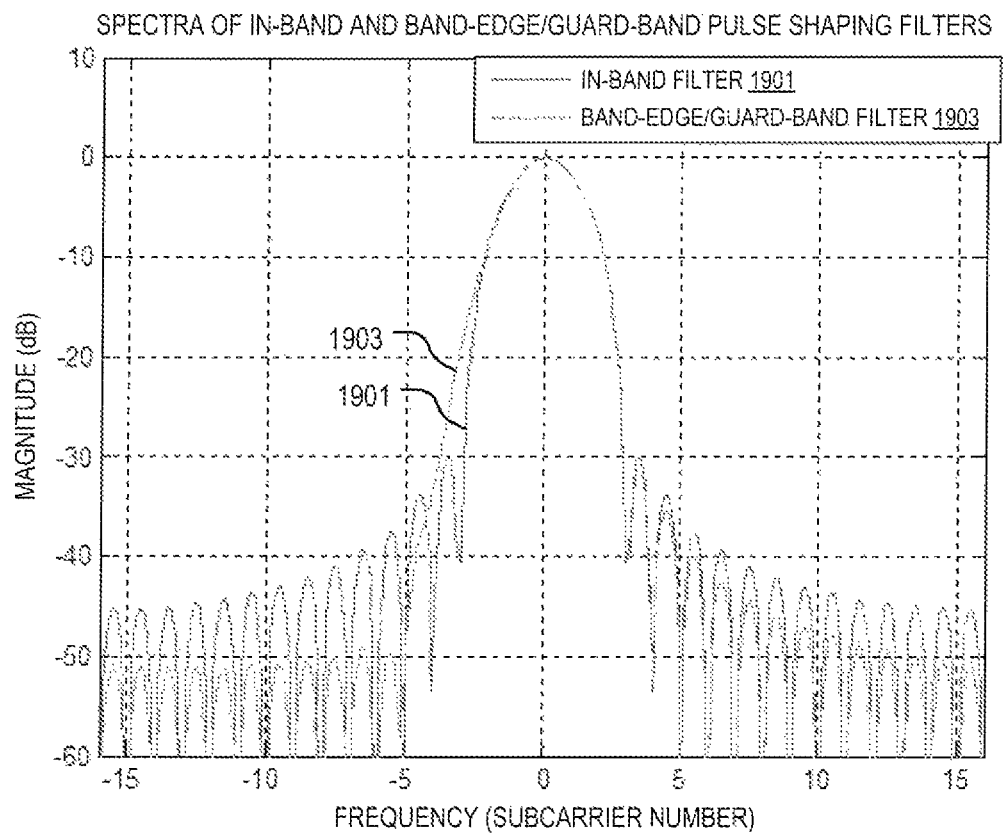
FIG. 19 provides a chart of a frequency response of a single-carrier signal using one embodiment of a pulse shaping filter deployed in-band and band-edge/guard-band in accordance with various aspects as described herein.
Figure 20:
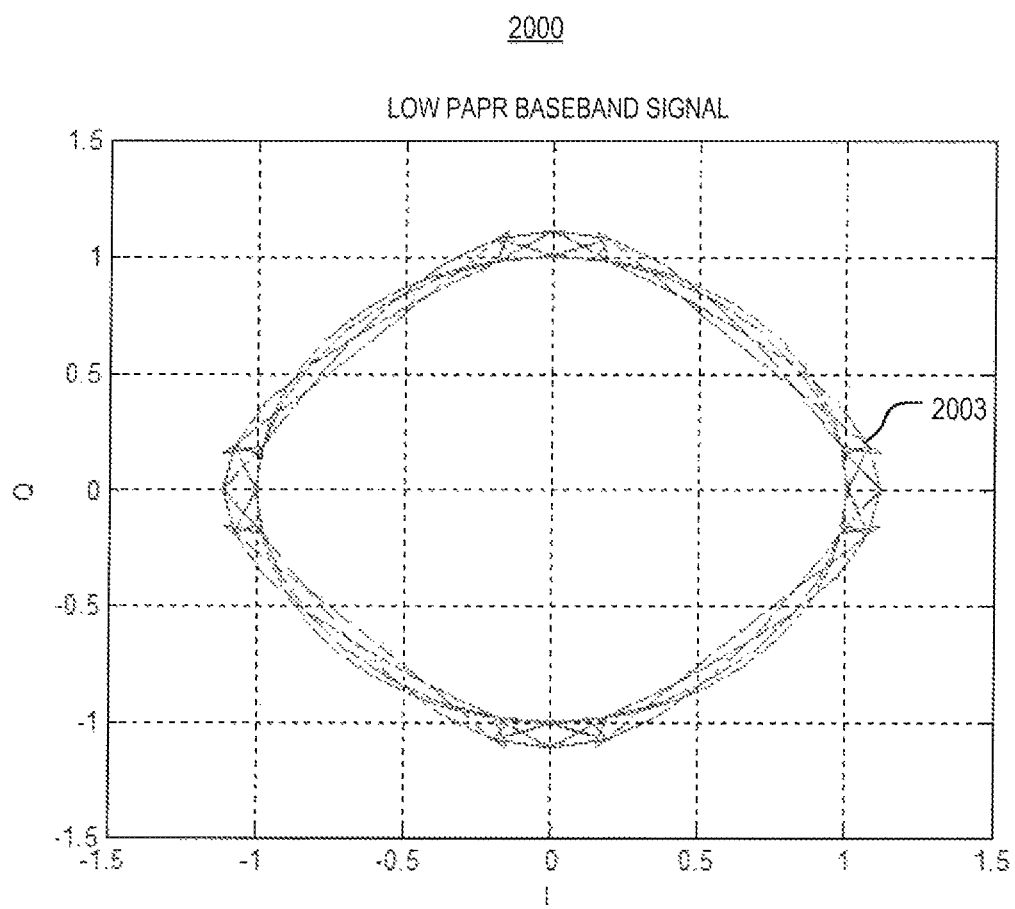
FIG. 20 illustrates a low PAPR baseband signal using one embodiment of a pulse shaping filter in accordance with various aspects as described herein.

Furthermore, the resulting pulse shaping filter corresponding to the asymmetric spectrum 1703 is complex valued with real component 1803*a* and imaginary component 1803*b*, as shown in FIG. 18. In FIG. 19, a symmetric spectrum 1901 of the Gaussian pulse shaping filter 1801 designed for in-band deployment is compared to an asymmetric spectrum 1903 of the pulse shaping filter 1803*a-b* designed for band-edge or guard-band deployment. FIG. 20 shows a low PAPR baseband signal 2003 generated using the asymmetric modified Gaussian pulse shaping filter 1803*a-b* as illustrated in FIG. 18.

Figure 21:
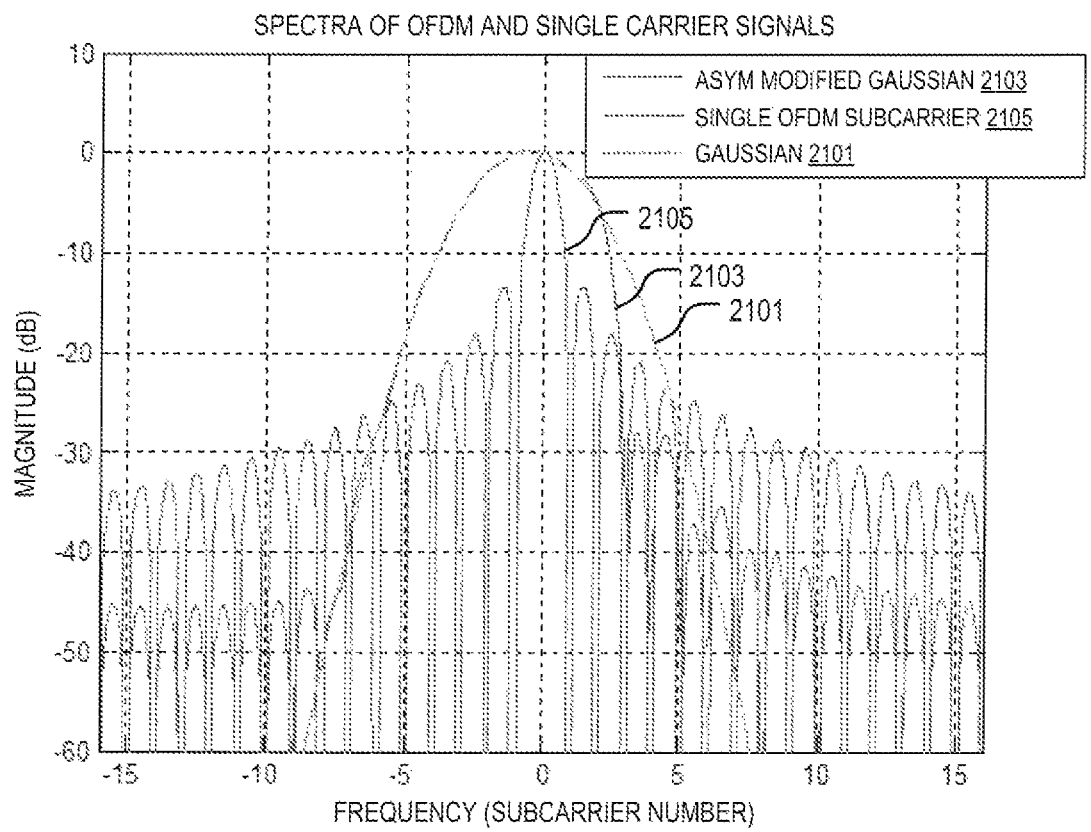
FIG. 21 provides a chart of a frequency response of a single-carrier signal using one embodiment of a pulse shaping filter with a carrier frequency that is different from a carrier or sub-carrier frequency of the OFDM in accordance with various aspects as described herein.

Waveform Design for Deployment of Single Carrier Waveform with Center of Frequency not Coinciding with the OFDM Channel Raster:

In the previous examples, the center frequency of the single carrier waveform was chosen to coincide with the center frequency of some OFDM subcarrier. However, this may be unnecessary or undesirable. For in-band deployment, it may be desired to allocate a subband spanning an even number of subcarriers (e.g., 6 subcarriers), and in this case, the bandwidth may be better utilized if the single carrier waveform is centered at about the arithmetic mean of two adjacent subcarriers. For guard-band or edge-band deployment, there may be two contradicting goals for selecting a location of the center frequency of the single carrier waveform. First, it may be desirable to place the center frequency as far as possible from the in-band subcarriers such as to fully utilize the guard band. Second, it may be desirable to place the center frequency as close to the in-band subcarriers such as to meet any spectrum mask or out-of-band emissions requirements. A center frequency that is different from a center frequency of a subchannel of the second communications system may give the best compromise between these conflicting goals. FIG. 21 illustrates this scenario of a frequency response of a single-carrier signal using one embodiment of a pulse shaping filter with a carrier frequency that is different from a carrier or sub-carrier frequency of a single OFDM subcarrier. In FIG. 21, the center frequency of a spectrum 2103 of the asymmetric modified Gaussian pulse shaping filter 1803*a-b* is located about 1.5 subcarrier widths to the left of the center frequency of a spectrum 2105 of a single OFDM subcarrier 2105 that corresponds to subcarrier number zero (0) and the center frequency of a spectrum 2101 of the Gaussian pulse shaping filter 1801.

Abbreviations

| ABBREVIATIONS | |
|---|---|
| Abbreviation | Explanation |
| 3GPP | 3rd Generation Partnership Project |
| BS | Base Station |
| CP | Cyclic Prefix |
| DFT | Discrete Fourier Transform |
| DL | Downlink |
| eNB | Evolved Node B (i.e., base station) |
| E-UTRA | Evolved Universal Terrestrial Radio Access |
| E-UTRAN | Evolved Universal Terrestrial Radio Access Network |
| FFT | Fast Fourier Transform |
| ICI | Inter-Carrier Interference |
| IoT | Internet of Things |
| LTE | Long Term Evolution |
| MIMO | Multiple Input Multiple Output |
| MSR | Multi-Standard Radio |
| MTC | Machine-Type Communication |
| NB-IoT | Narrow-Band Internet of Things |
| NB-LTE | Narrow-Band LTE (e.g., 180 KHz bandwidth) |
| OFDM | Orthogonal Frequency Division Modulation |
| OFDMA | Orthogonal Frequency Division Modulation Access |
| PA | Power Amplifier |
| PAPR | Peak-to-Average Power Ratio |
| PRACH | Physical Random Access Channel |
| PRB | Physical Resource Block |
| PUSCH | Physical Uplink Shared Channel |
| RACH | Random Access Channel |
| RAT | Radio Access Technology |
| RF | Radio Frequency |
| SoC | System-on-a-Chip |
| SC-FDMA | Single-Carrier, Frequency Division Multiple Access |
| Tx | Transmitter |
| UE | User Equipment |
| UL | Uplink |
| WB-LTE | Wideband LTE (i.e., corresponds to legacy LTE) |

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method performed by a wireless device for transmitting a signal in a first communication system that uses single-carrier, linear modulation and is frequency-domain multiplexed with a second communication system that uses orthogonal frequency division multiplexing (OFDM), the method comprising:
   generating, by a modulator of the wireless device, a modulated signal that represents one or more information symbols, wherein the modulated signal includes one or more modulation symbols of the first communication system with each modulation symbol having:
   i) a period that corresponds to a symbol rate of the second communication system, and
   ii) a starting time such that the modulation symbol starts in a cyclic prefix interval of modulation symbols of the second communication system;
   filtering, by a pulse shaping filter of the wireless device, the modulated signal to obtain the filtered modulated signal, wherein the pulse shaping filter operates with a period that corresponds to the symbol rate of the second communication system and has a frequency response that reduces a magnitude of the modulated signal at a frequency that corresponds to a frequency of at least one carrier or sub-carrier of a signal transmitted in the second communication system;
   determining a carrier frequency of the filtered modulated signal, wherein the carrier frequency of the filtered modulated signal is in a guard band of the second communication system;
   adjusting the carrier frequency of the filtered modulated signal to compensate for a decay in magnitude in the guard band of the second communication system; and
   transmitting, by a transmitter of the wireless device, the filtered modulated signal at a carrier or sub-carrier frequency of the first communication system that is different from a carrier or sub-carrier frequency of the second communication system and at the carrier frequency of the filtered modulated signal.

2. The method of claim 1, wherein the modulated signal of the first communication system further represents a duration that is equal to or less than a duration of one modulation symbol of the second communication system.

3. The method of claim 1, wherein each modulation symbol of the first communication system is aligned in time with a modulation symbol of the second communication system.

4. A wireless device for transmitting a signal in a first communication system that uses single-carrier, linear modulation and is frequency-domain multiplexed with a second communication system that uses orthogonal frequency division multiplexing (OFDM), the wireless device comprising:
   a processor; and
   a memory containing instructions executable by the processor, wherein the wireless device is configured to:

generate a modulated signal that represents one or more information symbols, wherein the modulated signal includes one or more modulation symbols of the first communication system with each modulation symbol having:
i) a period that corresponds to a symbol rate of the second communication system, and
ii) a starting time such that the modulation symbol starts in a cyclic prefix interval of modulation symbols of the second communication system;
filter, by a pulse shaping filter of the wireless device, the modulated signal to obtain the filtered modulated signal, wherein the pulse shaping filter is configured to operate with a period that corresponds to the symbol rate of the second communication system and has a frequency response that reduces a magnitude of the modulated signal at a frequency that corresponds to a frequency of at least one carrier or sub-carrier of a signal transmitted in the second communication system;
determine a carrier frequency of the filtered modulated signal, wherein the carrier frequency of the filtered modulated signal is in a guard band of the second communication system;
adjust the carrier frequency of the filtered modulated signal to compensate for a decay in magnitude in the guard band of the second communication system; and
transmit the filtered modulated signal at a carrier or sub-carrier frequency of the first communication system that is different from a carrier or sub-carrier frequency of the second communication system and at the carrier frequency of the filtered modulated signal.

5. A method performed by a wireless device for receiving a signal in a first communication system that uses single-carrier, linear modulation and is frequency-domain multiplexed with a second communication system that uses orthogonal frequency division multiplexing (OFDM), the method comprising:
receiving, by a receiver of the wireless device, a filtered modulated signal, the filtered modulated signal being received at a carrier or sub-carrier frequency of the first communication system that is different from a carrier or sub-carrier frequency of the second communication system and at a carrier frequency of the filtered modulated signal, wherein the carrier frequency of the filtered modulated signal is in a guard band of the second communication system and is adjusted to compensate for a decay in magnitude in the guard band of the second communication system, wherein the filtered modulated signal is obtained by filtering a modulated signal that represents one or more information symbols, and wherein the modulated signal includes one or more modulation symbols of the first communication system with each modulation symbol having: i) a period that corresponds to a symbol rate of the second communication system, and ii) a starting time such that the modulation symbol starts in a cyclic prefix interval of modulation symbols of the second communication system; and demodulating, by a demodulator of the wireless device, the filtered modulated signal to obtain the one or more information symbols.

6. The method of claim 5, wherein each modulation symbol of the first communication system further has a duration that is equal to or less than a duration of one modulation symbol of the second communication system.

7. The method of claim 5, wherein each modulation symbol of the first communication system is aligned in time with a modulation symbol of the second communication system.

8. The method of claim 5, wherein said receiving includes receiving a combined signal that includes the filtered modulated signal of the first communication system and a modulated signal of the second communication system; and
wherein said demodulating includes performing a single discrete Fourier transform (DFT) on the combined signal to obtain the one or more information symbols associated with the filtered modulated signal of the first communication system and information symbols associated with the modulated signal of the second communication system.

9. The method of claim 5, wherein said demodulating includes using a discrete Fourier transform (DFT) circuit, and wherein a single DFT circuit is used to demodulate at least one of the filtered modulated signal of the first communication system and a modulated signal of the second communication system.

10. A wireless device for receiving a signal in a first communication system that uses single-carrier, linear modulation and is frequency-domain multiplexed with a second communication system that uses orthogonal frequency division multiplexing (OFDM), the wireless device comprising:
a processor; and
a memory containing instructions executable by the processor, wherein the wireless device is configured to:
receive a filtered modulated signal, the filtered modulated signal being received at a carrier or sub-carrier frequency of the first communication system that is different from a carrier or sub-carrier frequency of the second communication system and at a carrier frequency of the filtered modulated signal, wherein the carrier frequency of the filtered modulated signal is in a guard band of the second communication system and is adjusted to compensate for a decay in magnitude in the guard band of the second communication system, wherein the filtered modulated signal is obtained by filtering a modulated signal that represents one or more information symbols, and wherein the modulated signal includes one or more modulation symbols of the first communication system with each modulation symbol having: i) a period that corresponds to a symbol rate of the second communication system, and ii) a starting time such that the modulation symbol starts in a cyclic prefix interval of modulation symbols of the second communication system; and
demodulate the filtered modulated signal to obtain the one or more information symbols.

* * * * *